(12) United States Patent
Okana et al.

(10) Patent No.: US 7,270,369 B2
(45) Date of Patent: Sep. 18, 2007

(54) AUTOMOBILE UNDERBODY STRUCTURE

(75) Inventors: Fumio Okana, Fuchu-cho (JP);
Noritaka Sakiyama, Fuchu-cho (JP);
Yukiichirou Shimada, Fuchu-cho (JP);
Shigeyuki Mori, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 18 days.

(21) Appl. No.: 11/213,880

(22) Filed: Aug. 30, 2005

(65) Prior Publication Data

US 2006/0061143 A1    Mar. 23, 2006

(30) Foreign Application Priority Data

| Sep. 22, 2004 | (JP) | ............... 2004-274515 |
| Sep. 22, 2004 | (JP) | ............... 2004-274516 |
| Sep. 29, 2004 | (JP) | ............... 2004-284893 |

(51) Int. Cl.
*B62D 25/20* (2006.01)

(52) U.S. Cl. .................. 296/204; 296/187.03

(58) Field of Classification Search ............... 296/204, 296/187.03, 187.09
See application file for complete search history.

(56) References Cited

U.S. PATENT DOCUMENTS

| 3,108,836 | A | * | 10/1963 | Deckert ................. 296/204 |
| 5,921,618 | A | * | 7/1999 | Mori et al. ............ 296/187.12 |
| 5,992,921 | A | * | 11/1999 | Seki ..................... 296/187.09 |
| 6,203,099 | B1 | * | 3/2001 | Iwatsuki ................. 296/204 |
| 6,676,183 | B2 | * | 1/2004 | Yoshida et al. ........... 296/30 |

FOREIGN PATENT DOCUMENTS

| EP | 0 930 219 A2 | 7/1999 |
| EP | 0 937 631 A2 | 8/1999 |
| EP | 1 531 115 A1 | 5/2005 |
| JP | 11-078959 | 3/1999 |
| JP | 11-286282 | * 10/1999 |

OTHER PUBLICATIONS

European Search Report dated Nov. 14, 2005 Application No. EP 05 01 8957.

* cited by examiner

*Primary Examiner*—Dennis H. Pedder
(74) *Attorney, Agent, or Firm*—Nixon Peabody LLP; Donald R. Studebaker

(57) ABSTRACT

Disclosed is an automobile underbody structure, wherein a pair of laterally-spaced floor frames 10 are disposed to extend longitudinally in such a manner as to interpose a tunnel region 6 of a front floor portion 2 therebetween and joined to a bottom surface of the front floor portion 2, and a cross member 15, 16 is disposed to extend laterally so as to connect each side-sill 7 and the tunnel region 6 and joined to a top surface of the front floor portion 2. Each of the floor frames 10 is gradually inclined laterally inward toward the rear end thereof so as to be obliquely disposed relative to the cross member 15, 16 in top plan view. A rearward displacement of the floor frames 10 during a head-on collision exerts a compressive force on a region of the cross member 15, 16 located on the laterally outward side relative to each of the floor frames 10, and a tensile force on a region of the cross member 15, 16 located on the laterally inward side relative to each of the floor frames 10. The automobile underbody structure of the present invention makes it possible to effectively receive a shock during a head-on collision by the cross member.

12 Claims, 18 Drawing Sheets

AUTOMOBILE UNDERBODY STRUCTURE

TECHNICAL FIELD

The present invention relates to an underbody structure for an automobile.

BACKGROUND ART

There has been known an automobile body comprising a floor panel which includes a front floor portion connecting a pair of laterally-spaced side-sills to one another and having a tunnel region extending longitudinally along the lateral center thereof, a rear kick-up portion extending upward from a rear end of the front floor portion, and a rear floor portion extending from an upper end of the rear kick-up portion rearward and approximately linearly. It is also generally known to provide a pair of laterally-spaced floor frames which are disposed to extend longitudinally in such a manner as to interpose the tunnel region therebetween, and joined to a bottom surface of the front floor portion, and a cross member which is disposed to extend laterally so as to connect each of the side-sills and the tunnel region, and joined to a top surface of the front floor portion.

Further, as a commonly used technique, when a pair of laterally-spaced front frames are disposed in front of the floor panel, each of the floor frames is designed to be located on a rearward extension line of a corresponding one of the front frames, in top plan view, and connect a front end of the floor frame to a rear end of the front frame, so as to allow a rearward load during a head-on collision to be effectively transmitted from the front frame to the floor frame.

Generally, each of the floor frames is disposed to extend straight or linearly and parallel to a longitudinal axis of the automobile body, and intersect orthogonally with the cross member, in top plan view. While the following Patent Publication 1 (Japanese Patent Laid-Open Publication No. 11-078959) discloses a pair of laterally-spaced floor frames each gradually inclined laterally inward toward a rear end thereof, any technical meaning of inclining the floor frames as above is not disclosed therein because a technical problem recognized therein has no direct relation with the floor frames. It would be considered that each of the front frames is designed to be simply located on a rearward extension line of a corresponding one of the front frames spaced from one another by a distance which is increased toward front ends thereof, because a technique disclosed in the Patent Publication 1 is characterized by employing a unique structure in which a subframe disposed between the pair of laterally-spaced front frames is formed in a approximately triangular shape widened toward a front end thereof in top plan view, and the frames are spaced from one another by a distance which is increased toward the front ends thereof in conformity to the shape of the subframe (gradually inclined laterally outward toward the front ends thereof).

During a head-on collision, an impact load entered rearward into each of the front frames is transmitted to the corresponding floor frame. In this process, the rearward load entered into the floor frame acts on the cross member as a bending or shear force against which the cross member has a weak resistance in terms of material dynamics. Thus, in view of effective utilization of the cross member for measures against collisions, there remains a point to be solved.

DISCLOSURE OF THE INVENTION

In view of the above circumstances, it is therefore an object of the present invention to provide an automobile underbody structure capable of effectively utilizing a cross member to efficiently absorb a shock during a head-on collision.

In order to achieve the above object, the present invention employs the following solutions.

As described in claim 1 of the appended claims, the present invention provides an automobile underbody structure comprising: a floor panel which includes a front floor portion connecting a pair of laterally-spaced side-sills to one another and having a tunnel region extending longitudinally along the lateral center thereof, a rear kick-up portion extending upward from a rear end of the front floor portion, and a rear floor portion extending from an upper end of the rear kick-up portion rearward and approximately linearly; a pair of laterally-spaced floor frames disposed to extend longitudinally in such a manner as to interpose the tunnel region therebetween, and joined to a bottom surface of the front floor portion; a cross member disposed to extend laterally so as to connect each of the side-sills and the tunnel region, and joined to the front floor portion; and a pair of laterally-spaced front frames each having a rear end joined to a front end of a corresponding one of the floor frames. Each of the floor frames has a rear end extending up to the vicinity of the rear kick-up portion, and each of the floor frames is inclined laterally inward toward the rear end thereof so as to be obliquely disposed relative to the cross member in top plan view.

According to the above solution, due to occurrence of a head-on collision, when the floor frames receiving a rearward load from the front frames is just about being displaced rearward, the floor frames will exert a compressive force on a region of the cross member located on the laterally outward side relative to each of the floor frames, and a tensile force on a region of the cross member located on the laterally inward side relative to each of the floor frames. Thus, the cross member can receive the load during the head-on collision in the form of compression and tension against which the cross member has a strong resistance in terms of material dynamics, so that the load during the head-on collision can be effectively received or absorbed by the cross member. As compared with a pair of floor frames each disposed to extend straight and parallel to the longitudinal axis of an automobile body, the inclined floor frames make it possible to reliably increase the entire length thereof. This is also desirable in enhancing a shock-absorbing function of the floor frames themselves.

These and other objects, features and advantages of the present invention will become more apparent upon reading the following detailed description along with the accompanied drawings.

DETAILED DESCRIPTION OF THE INVENTION

Figure 1:
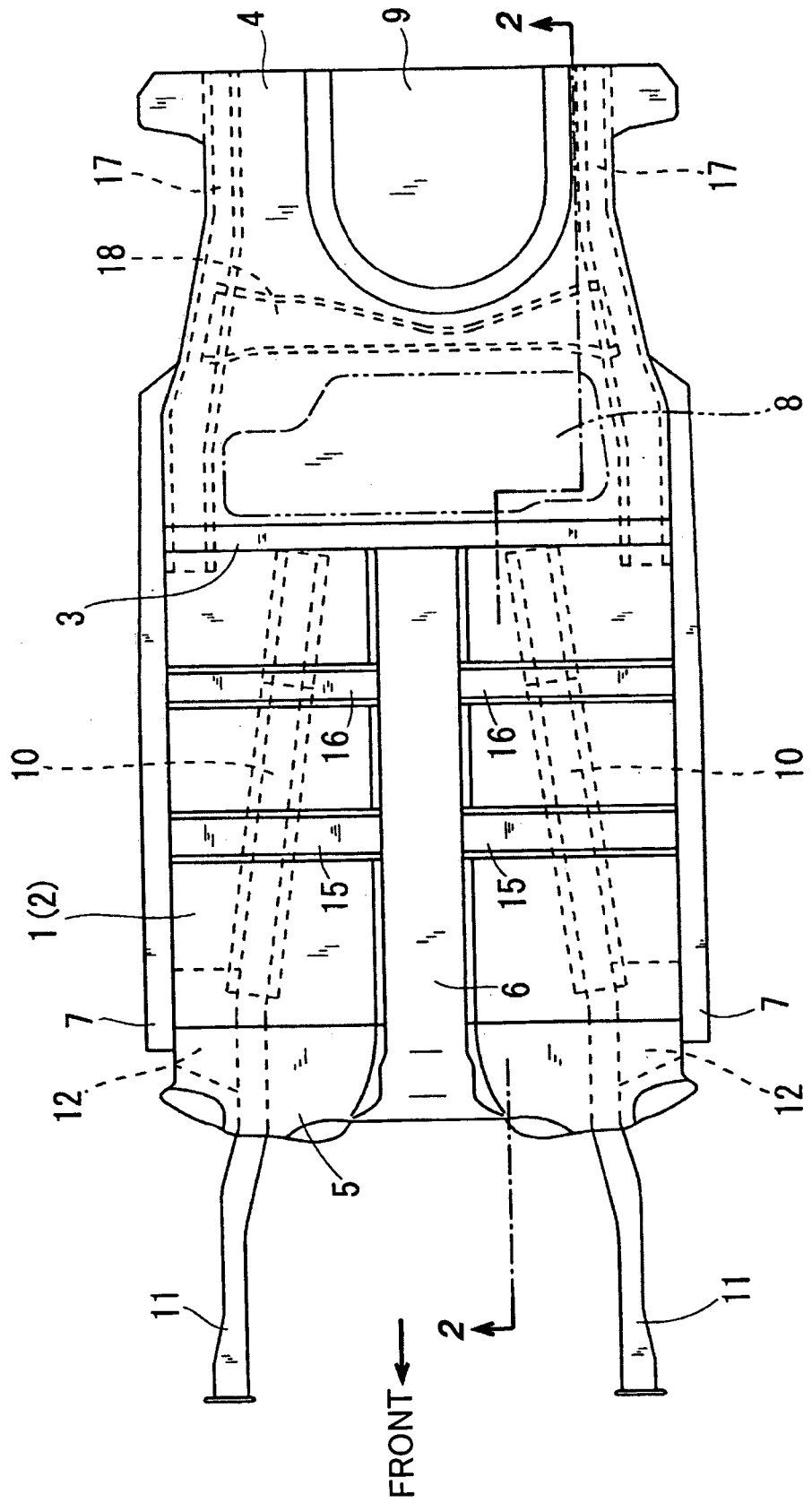
FIG. 1 is a top plan view of an automobile underbody structure according to one embodiment of the present invention.
Figure 2:
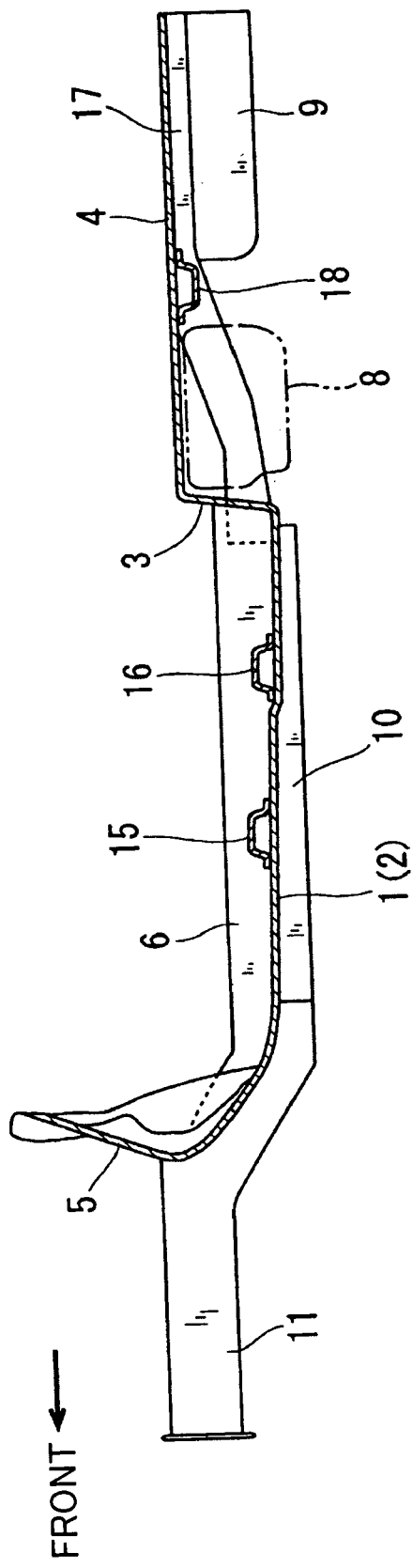
FIG. 2 is a sectional view taken along the line 2-2 in FIG. 1.

In FIGS. 1 and 2, the reference numeral 1 indicates a floor panel which is prepared by joining a plurality of panel members formed as longitudinally-divided pieces. This floor panel 1 generally comprises a front floor portion 2, a rear kick-up portion 3 raised upward from a rear end of the front floor portion 2 by a short distance, and a rear floor portion 4 extending rearward from an upper end of the rear kick-up portion 3. The front floor portion 2 has a front end connected to a lower end of a dash panel 5 extending vertically to separate between a passenger compartment and an engine room.

The front floor portion 2 is formed with a tunnel region 6 extending longitudinally and along the lateral center thereof. This tunnel region 6 has a front end (frontward opening) connected to the dash panel, and a rear end (rearward opening) connected to the rear kick-up portion 3. This front floor portion 2 has opposite lateral ends joined, respectively, to a pair of laterally-spaced side-sills 7 each extending longitudinally and serving as a strength member.

A fuel tank 8 is disposed just behind the rear kick-up portion 3 and immediately below the rear floor portion 4. A region of the rear floor portion 4 on the rearward side of the fuel tank 8 is expanded downward to form a storage region 9 capable of storing a spare tire or the like therein.

Figure 3:
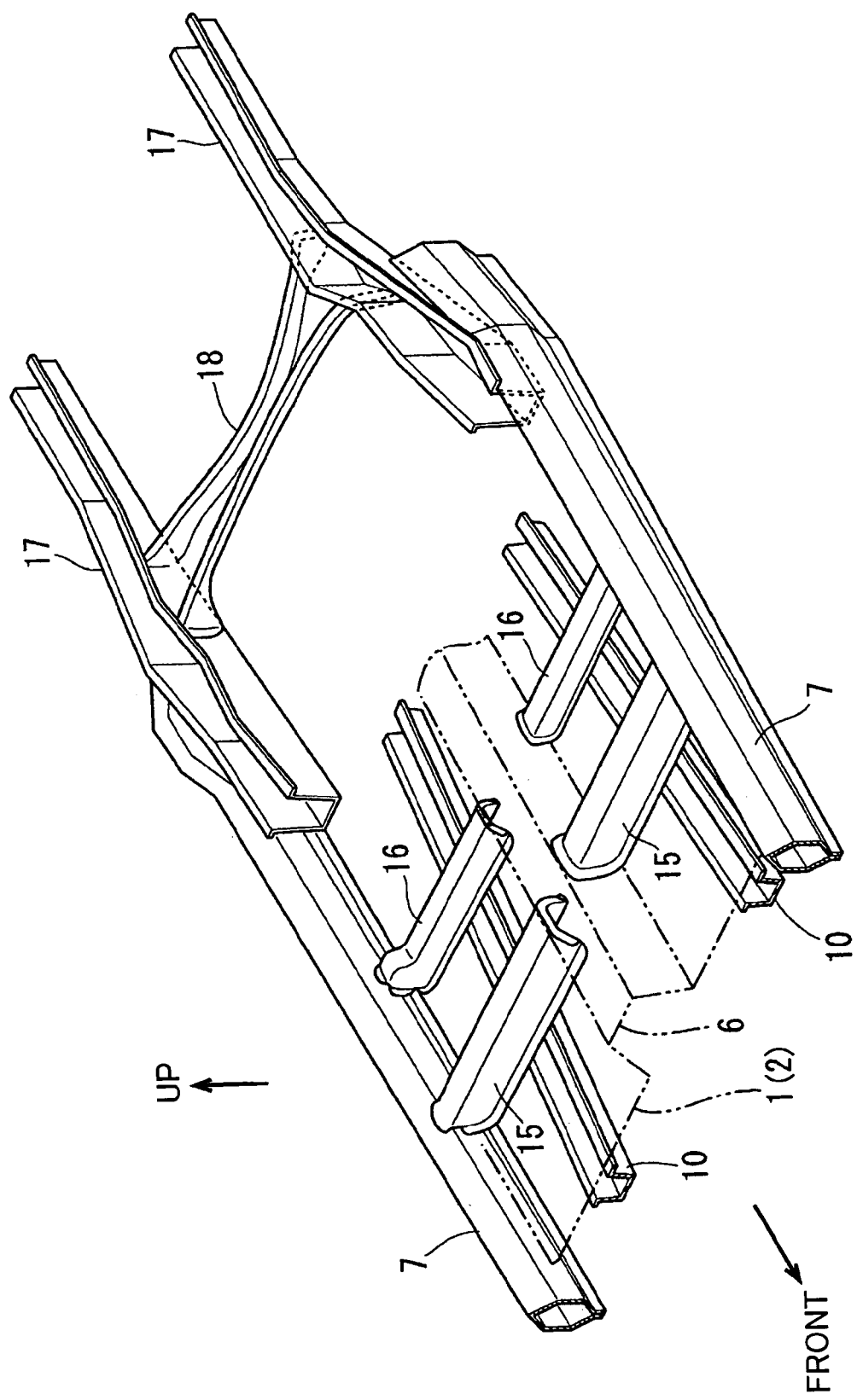
FIG. 3 is a perspective view showing an arrangement of strength members, such as a floor frame, a cross member, a side-sill and a rear frame, in FIG. 1.

As shown in FIGS. 1 to 3, a pair of laterally-spaced floor frames 10 are joined to a bottom surface of the front floor portion 2, and the tunnel region 6 is located between the floor frames 10.

Each of the floor frames 10 is arranged to be located between the tunnel region 6 and an adjacent one of the side-sills 7 in the lateral direction of an automobile body. While each of the floor frames 10 extends longitudinally and linearly as a whole, it is inclined relative to the longitudinal axis of the automobile body. More specifically, each of the floor frames 10 is gradually inclined laterally inward (to come closer to the tunnel region 6) toward a rear end thereof. That is, a lateral distance between respective front ends of the floor frames 10 is set to be greater than a lateral distance between respective rear ends of the floor frames 10. Each of the floor frames 10 is arranged to have the same angle of inclination. Each of the floor frames 10 is formed in a reverse-hat shape in section which has an upward opening, as described in detail later, so as to allow a closed section to be defined when each of the floor frames 10 is joined to the front floor portion 2.

Figure 4:
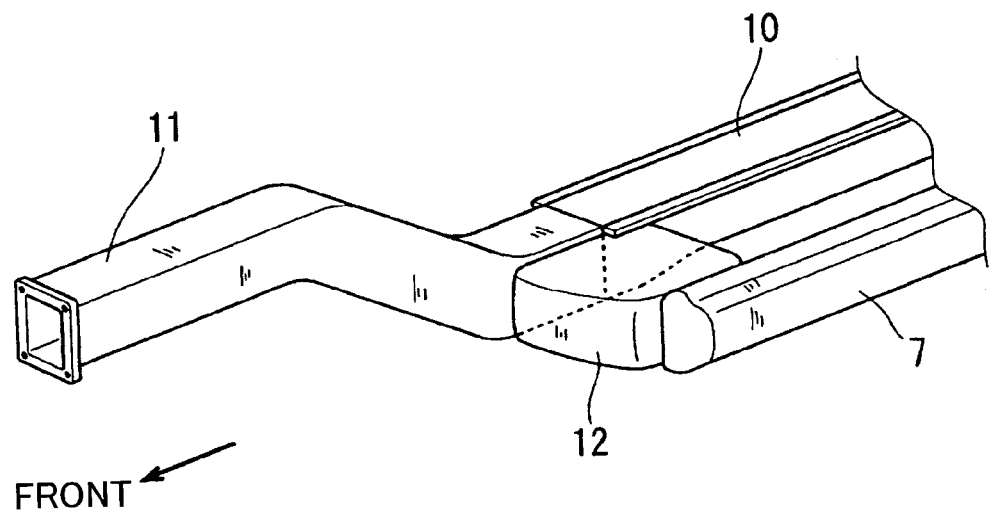
FIG. 4 is a perspective view showing a connected state of the floor frame, the cross member and a front floor portion.

Additionally referring to FIG. 4, each front end of the floor frames 10 is joined and connected directly to a corresponding one of rear ends of a pair of laterally-spaced front frames 11. Specifically, the pair of front frames 11 are disposed parallel to one another, and each of the front frames 11 is disposed parallel to the longitudinal axis of the automobile body (without inclination in top plan view. A lateral distance between respective rear ends of the front frames 11 is set to be approximately equal to the lateral distance between the front ends of the floor frames 10. This arrangement of the front frames 11 themselves is the same as that in a commonly-used underbody structure. This makes it possible to mount an engine (power train) using the front frames 11 in a conventional manner without change.

The rear end of each of the front frames 11 is designed to be located rearward relative to each front end of the side-sills 7. Then, a rear end region of the front frame 11, a front end region of the corresponding side-sill 7 and a front end region of the corresponding floor frame 10 are connected to each other by a torque box 12 serving as a strength member.

Two sets of longitudinally-spaced cross members 15, 16 are joined to a top surface of the front floor portion 2. Specifically, the first cross member 15 located on the front side is disposed at a longitudinally approximately intermediate position of the front floor portion 2, and the second cross member 16 located on the rear side is disposed at an approximately intermediate position between the first cross member 15 and the rear kick-up portion 3. Each of the first and second cross members 15, 16 is composed of two sub-members laterally segmentalized by the tunnel region 6. Each of the first and second cross members 15, 16 connects each inward-facing surface of the side-sills 7 and an outward-facing surface of the tunnel region 6. Each of the first and second cross members 15, 16 is formed in an approximately hat shape in section which has a downward opening, so as to allow a closed section to be defined when each of the first and second cross members 15, 16 is joined to the front floor portion 2. As with a conventional underbody structure, each of the first and second cross members 15, 16 is disposed to extend in a direction orthogonal to the longitudinal axis of the automobile body, or obliquely disposed relative to each of the floor frames 10 in top plan view.

A pair of laterally-spaced rear frames 17 are joined to a bottom surface of the rear floor portion 4. Each of the rear frames 17 has a front end region joined to a corresponding one of rear end regions of the side-sills 7. These rear frames 17 are connected to one another at a position between the fuel tank 8 and the storage region 9 by a third cross member 18 which extends laterally. Each of the rear frames 17 is formed in a reverse-hat shape in section which has an upward opening, so as to allow a closed section to be defined when each of the rear frames 17 is joined to the rear floor portion 4.

Figure 5:
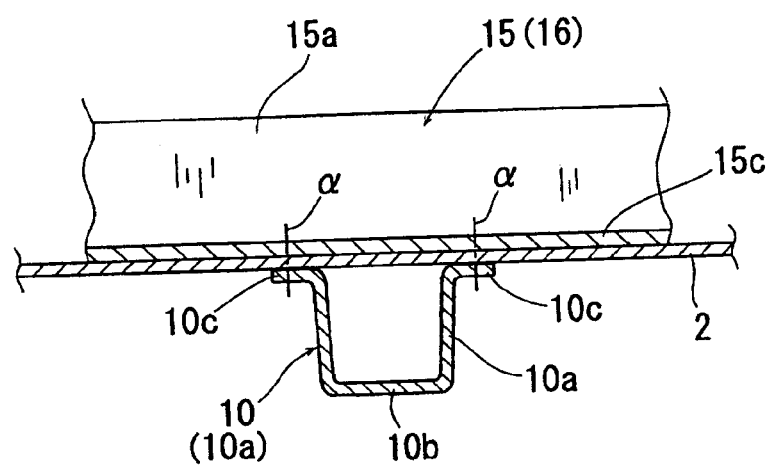
FIG. 5 is a sectional view showing a junctional relationship of the floor frame, the cross member relative and a front floor portion, taken along the line 5-5 in FIG. 6.
Figure 6:
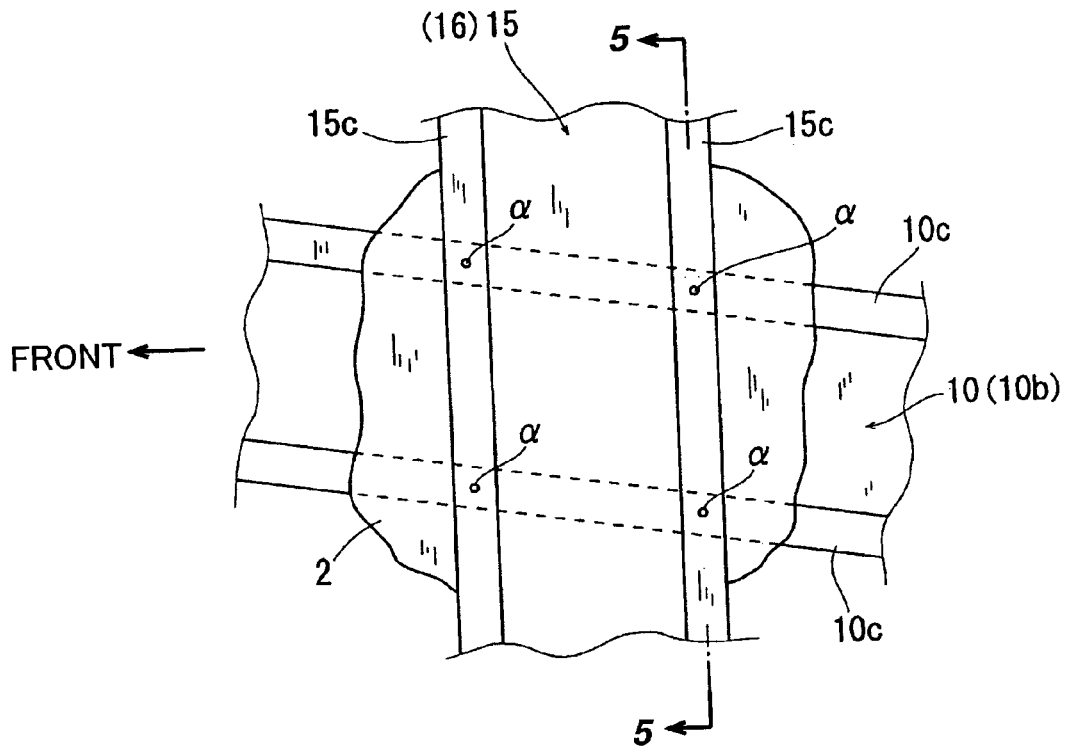
FIG. 6 is a fragmentary top view showing an intersecting area between the floor frame and the cross member.
Figure 7:
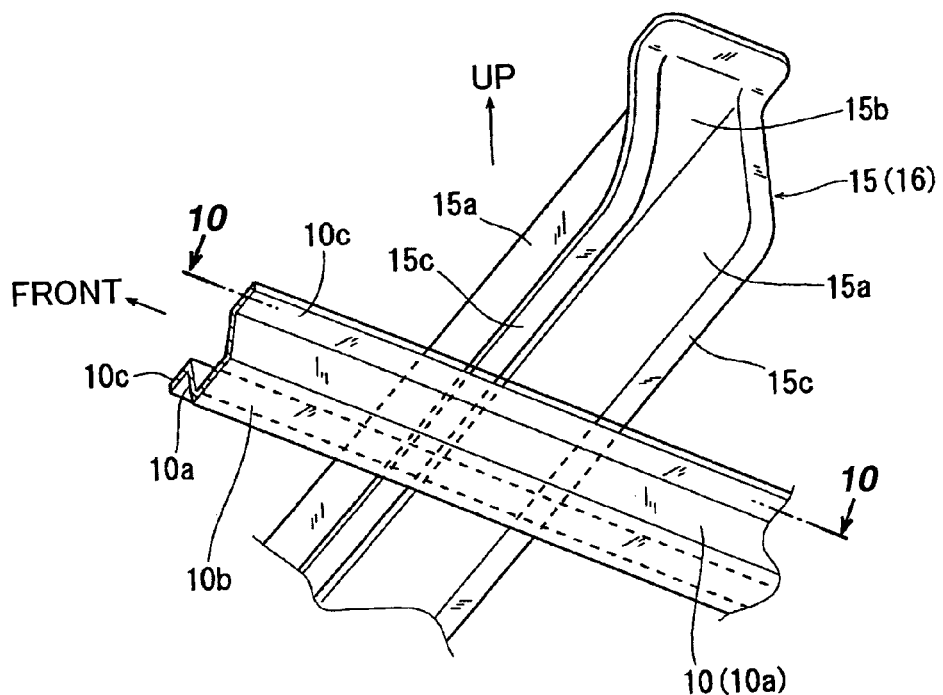
FIG. 7 is a fragmentary perspective bottom view showing the intersecting area between the floor frame and the cross member, wherein the front floor portion is omitted.

With reference to FIGS. 5 to 7, a relationship between respective joined regions of the cross members 15, 16 and the floor frames 10 relative to the front floor portion 2 will be described in detail. As shown in FIGS. 5 and 7, each of the floor frames 10 has a pair of laterally-spaced sidewalls 10a, a bottom wall 10b connecting respective lower ends of the sidewalls 10a to one another, and a pair of laterally-spaced flanges 10c each extending approximately horizontally from a corresponding one of upper ends of the sidewalls 10a. After the flanges 10c are seated on the bottom surface of the front floor portion 2, each of the floor frames 10 is joined (welded in this embodiment) to the front floor portion 2 (in FIG. 7, the front floor portion 2 is omitted).

Each of the cross members 15, 16 is joined to the front floor portion 2 and the floor frames 10 in the same manner. Thus, the following description will be made with a focus on the first cross member 15. The first cross member 15 has a pair of longitudinally-spaced sidewalls 15a, a top wall 15b connecting respective upper ends of the sidewalls 15a to one another, and a pair of longitudinally-spaced flanges 15c each extending approximately horizontally from a corresponding one of lower ends of the sidewalls 15a. After the flanges 15c are seated on the top surface of the front floor portion 2, the first cross member 15 is joined (welded in this embodiment) to the front floor portion 2 (in FIG. 7, the front floor portion 2 is omitted).

As seen in FIGS. 1, 6 and 7, the laterally-spaced flanges 10c of each of floor frames 10 and the longitudinally-spaced flanges 15c of the cross member 15 (the same goes for the cross member 16) intersect with each other at total four positions. The laterally-spaced flanges 10c and the longitudinally-spaced flanges 15c are joined to each other in these intersecting positions which are indicated by the reference mark "α" in FIGS. 5 and 6. As seen in FIG. 5, under the condition that the front floor portion 2 is sandwiched between one of the flanges 10c of one of the floor frames 10 and one of the flanges 15c of the cross member 15 (16), the two flanges 10c, 15c and the front floor portion 2 are joined (welded in this embodiment) to each other in a three-layer structure.

In the above structure, an impact load during a head-on collision is firstly entered into each of the front frames 11. Then, the impact load is transmitted from the front frame 11 to the corresponding floor frame 10, and simultaneously transmitted to the corresponding side-sill 7 through the torque box 12. Each of the floor frames 10 receiving the impact load will absorb the shock by itself and by the front floor portion 2 joined thereto. Simultaneously, in conjunction of a rearward displacement of the floor frames 10 caused by the received impact load, the impact load is transmitted from the floor frames 10 to the cross members 15, 26, and the cross members 15, 26 will also absorb the shock, as described in detail later. Each of the floor frames 10 is inclined or obliquely arranged. Thus, as compared with floor frames arranged without inclination, each of the floor frames 10 can have an increased entire length, so that the floor frames themselves and the front floor portion jointed to the floor frames 10 can effectively perform a shock-absorbing function.

Each of the floor frames 10 is obliquely disposed relative to the cross members 15, 16.

Thus, the impact load from the floor frames 10 to the cross members 15, 16 is transmitted in an oblique direction relative to the lateral axis of the automobile body. That is, in each of the cross members 15, 16, a region on the side of one of the side-sills 7 relative to the floor frame 10 adjacent thereto receives a compressive force, and a region on the side of the tunnel region 6 relative to the floor frame 10 receives a tensile force. The cross members 15, 16 have a large resistance against a compressive or tensile force, and thereby can more effectively receive a rearward impact load, as compared with conventional cross members simply designed to receive only a bending or shear force.

Among the two sets of longitudinally-spaced cross members 15, 16, as compared with the second cross member 16 located on the rear side, a larger rearward impact load is transmitted to the first cross member 15 located on the front side. In other word, a rearward impact load to be transmitted to the second cross member 16 located on the rear side is reduced to a relatively small value so as to prevent or suppress an excessive rearward displacement of each rear end of the floor frames 10.

Figure 8:
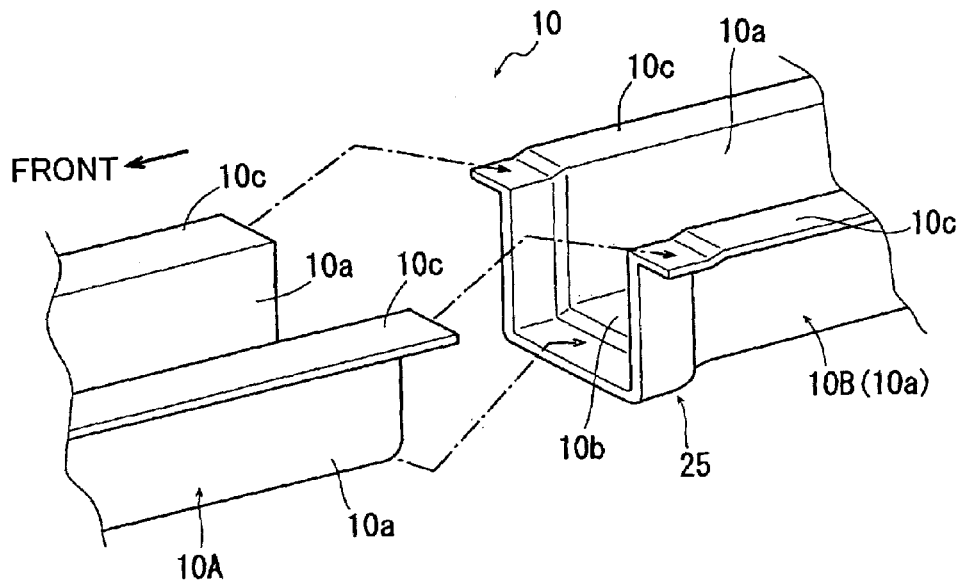
FIG. 8 is an explanatory exploded perspective view of a junctional relationship of front and rear portions of the floor frame.
Figure 9:
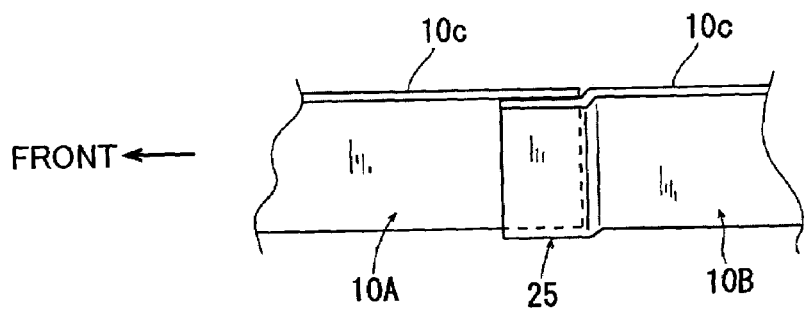
FIG. 9 is a side view showing a junctional region between the front and rear portions of the floor frame.
Figure 10:
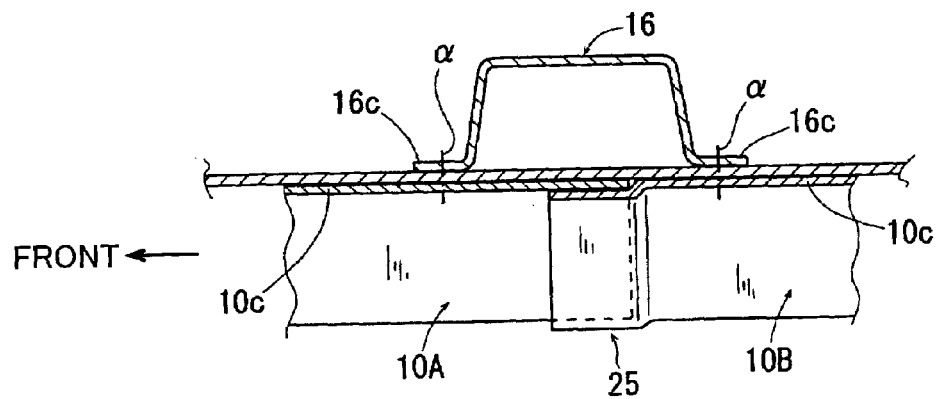
FIG. 10 is a sectional view showing a positional relationship of the cross member and the front and rear portions of the floor frame, and a junctional relationship thereof, taken along the line 10-10 in FIG. 7.

With reference to FIG. 8, a more preferred aspect of the present invention will be described below. FIGS. 8 to 10 show one example where each of the floor frames 10 has a front portion 10A and a rear portion 10B each of which is made of a different material. Specifically, in each of the floor frame 10, the front portion 10A is made of high-tensile steel, because a large impact load is transmitted thereto, and thereby it requires a relatively high strength against plastic deformation, and the rear portion 10B is made of ordinary steel, because only a small impact load is transmitted thereto as compared with the front portion 10A. Further, a rear end region of the front portion 10A and a front end region of the rear portion 10B are connected together as described in detail later. The front portion 10A in each of the floor frames 10 has a front end located at a longitudinally approximately intermediate position of the second cross member 16 (the longitudinally approximately intermediate position of the second cross member 16 corresponds to a position where the front portion 10A and the rear portion 10B in FIG. 10). This arrangement allows (the front portion 10A of) each of the floor frames 10 to reliably transmit an impact load up to the second cross member 16 located on the rear side, without occurrence of buckling therein.

While the connection between the front portion 10A and the rear portion 10B in each of the floor frames 10 may be performed by butt welding, it is preferable to utilize a fitting technique in the following manner in view of ensuring connection strength. Specifically, the front end region of the rear portion 10B in each of the floor frames 10 is formed as an enlarged region 25. Subsequently, the rear end region of the front portion 10A is fitted into the enlarged region 25, and then the rear end region of the front portion 10A and the enlarged region 25 of the rear portion 10B are welded to one another. The enlarged region 25 is formed by slightly offsetting the flanges 10c and the bottom wall 10b of the rear portion 10B downward and slightly offsetting each of the laterally-spaced sidewalls 10a of the rear portion 10B outward. Thus, when the rear end region of the front portion 10A is fitted into the enlarged region 25, respective regions of the front portion 10A and the rear portion 10B except for the enlarged region 25 (the laterally-spaced sidewalls 10a, the bottom wall 1b, the laterally-spaced flanges 10c) become flush with each other to provide smooth continuity therebetween.

As shown in FIG. 10, the front-side flange 16c of the second cross member 16 is joined to the flanges 10c of the front portion 10A (joined position is indicated by the reference mark "α"), and the rear-side flange 16c of the second cross member 16 is joined to the flanges 10c of the rear portion 10B (joined position is indicated by the reference mark "α"). In this manner, the second cross member 16 also serves as a connection member between the front portion 10A and the rear portion 10A in each of the floor frames 10 to provide higher connection strength between the front portion 10A and the rear portion 10A.

Figure 11:
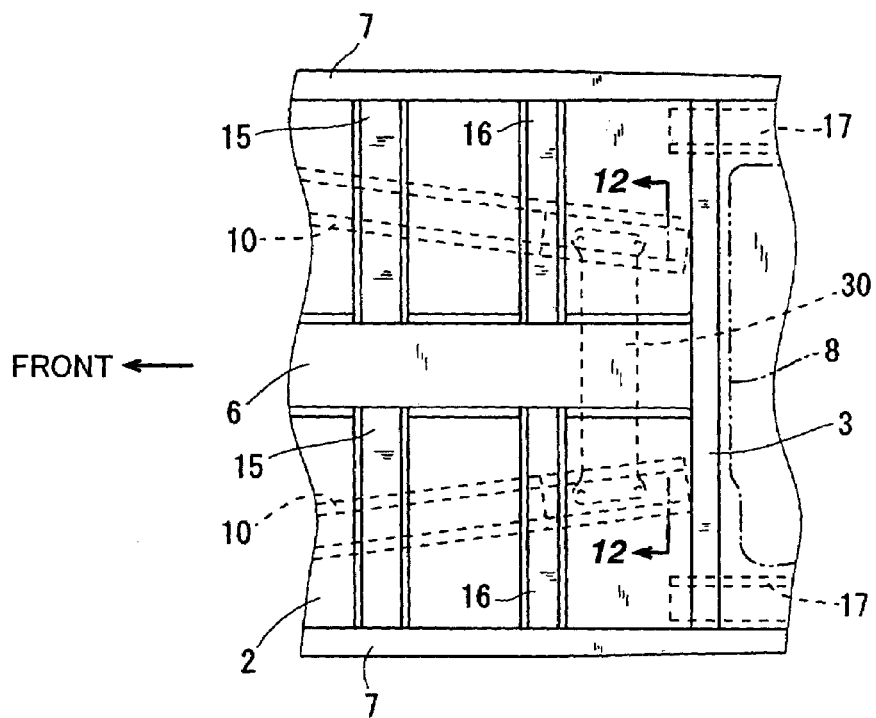
FIG. 11 is a fragmentary top plan view showing an automobile underbody structure according to another embodiment of the present invention.
Figure 12:
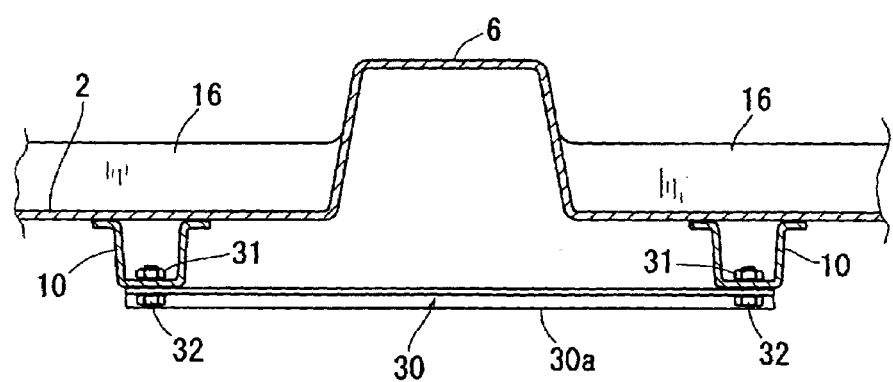
FIG. 12 is a sectional view taken along the line 12-12 in FIG. 11.
Figure 13:
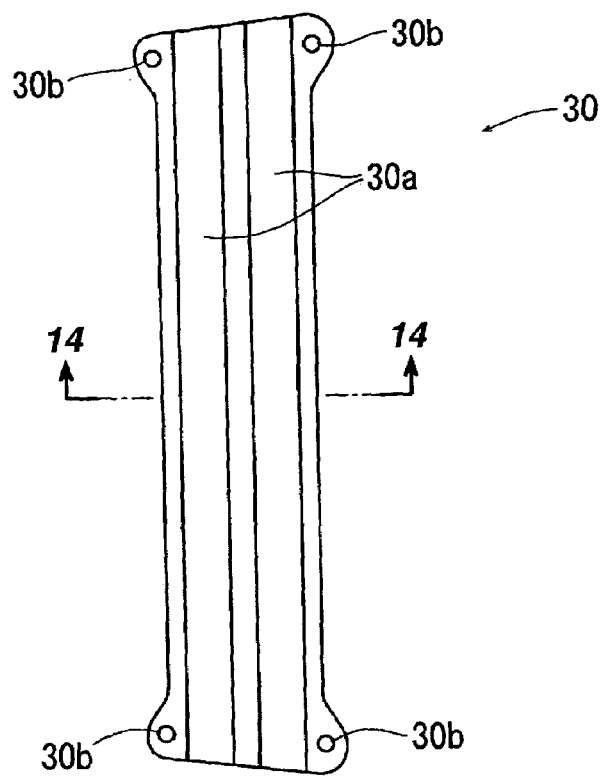
FIG. 13 is a top plan view of a connection member illustrated in FIG. 11.
Figure 14:
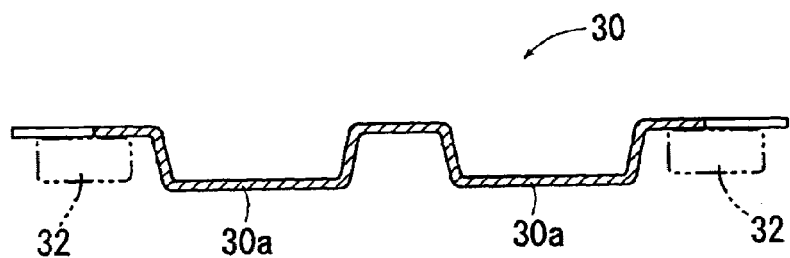
FIG. 14 is a sectional view taken along the line 14-14 in FIG. 13.

FIGS. 11 to 14 shows an automobile underbody structure having a connection member connecting respective rear end regions of the pair of laterally-spaced floor frames 10, according to another embodiment of the present invention. Specifically, as shown in FIG. 11, a connection member 30 is disposed between the second cross member 16 and the rear kick-up portion 3 to extend laterally, and respective rear end regions of the pair of laterally-spaced floor frames 10 are connected to one another through this connection member 30. As shown in FIGS. 12 to 14, the connection member 30 is formed with a bead 30a extending laterally to provide a large flexural or bending rigidity. For example, the bead 30a may be formed through a press forming process using an iron-based metal plate. The connection member 30 has opposite lateral end regions each formed with two mounting holes 30b (see FIG. 13).

The lateral end regions of the connection member 30 are seated, respectively, on bottom surfaces (bottom walls) of the floor frames 10, and then fastened, respectively, to the floor frames 10. More specifically, a nut 31 is fixed to each of the floor frames 10 in advance, and the connection member 30 is fastened to each of the floor frames 10 by inserting a bolt 32 into each of the mounting holes 30a and threadingly engaging the bolt 32 with the nut 31. A region of the connection member around each of the mounting holes 30a is set at a relatively upper position so as to prevent the head of the bolt 32 from protruding downward from the lowermost position of the connection member 30 prevent the head of the bolt 32 from coming into direct contact with a projection or raised portion on a road surface; see FIGS. 12 and 14).

The connection member 30 can prevent or suppress an excessive rearward deformation of each rear end of the floor frames 10 during a head-on collision (particularly during an offset collision). In addition, the connection member 30 can prevent or suppress a lateral expansion of the tunnel region 6 to enhance the rigidity, particularly torsional rigidity, of the automobile body. The distance between the rear ends of the floor frames 10 is set at a relatively small value, and thereby the connection member 30 can have a relatively short length.

As shown in FIG. 12, the connection member 30 is disposed to extend laterally linearly when viewing in the longitudinal direction of the automobile body, and across (an downward opening of) the tunnel region 6 (the connection member 30 is located below laterally-spaced sidewalls and a top wall of the tunnel region 6). That is, when an exhaust pipe or the like is arranged in an inner space of the tunnel region 6, the above arrangement allows the connection member to be attached even after the exhaust pipe or the like is arranged. The connection member 30 may be formed with two upwardly raised portions in the vicinity of the tunnel region 6 and on both lateral sides of the tunnel region 6, and these raised portions may be joined to the front floor portion 2 (e.g. welding joint or a joining using a fastener, such as a bolt). This structure is more desirable in increasing the rigidity of the automobile body, because it can more reliably prevent or suppress the lateral expansion of the tunnel region 6.

Figure 15:
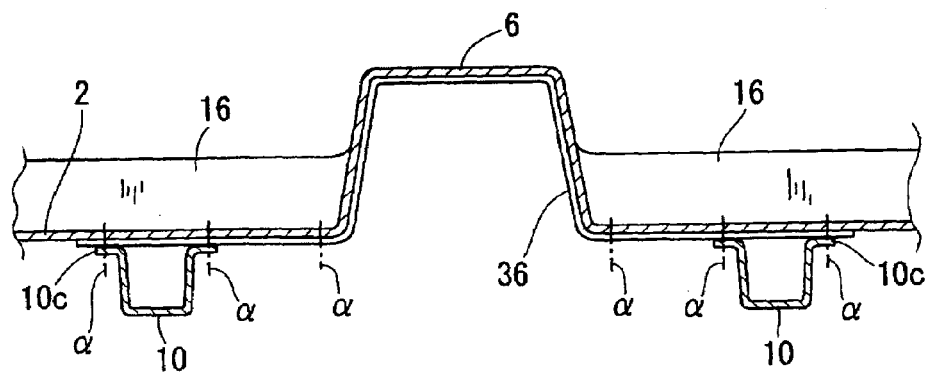
FIG. 15 is a sectional view corresponding to FIG. 12, which shows an automobile underbody structure according to yet another embodiment of the present invention.

FIG. 15 shows one modification of the above connection member 30. A connection member in FIG. 15 is the same as the connection member 30 illustrated in FIGS. 11 to 14 in the point of connecting respective rear end regions of the floor frames 10 to one another. The connection member 36 illustrated in FIG. 5 is formed, for example, of an iron-based metal plate, and disposed along the bottom surface of the front floor portion 2 and the inner surface of the tunnel region 6. That is, the connection member 36 serves as a means to partially increase a wall thickness of the tunnel region 6 and a region of the front floor portion 2 between the floor frames 10. This connection member 36 has opposite lateral ends each of which is sandwiched between the front floor portion 2 and (the flanges 10c of) a corresponding one of the floor frames 10, and welded together with the front floor portion 2 and the floor frame 10 in a three-layer structure (each joined position is indicated by the reference mark "α"). Further, the connection member 36 is also welded to the front floor portion 2 in the vicinity of the tunnel region 6 and on both lateral sides of the tunnel region 6 (each joined position is indicated by the reference mark "α"). This can prevent or suppress the lateral expansion of the tunnel region 6.

Figure 16:
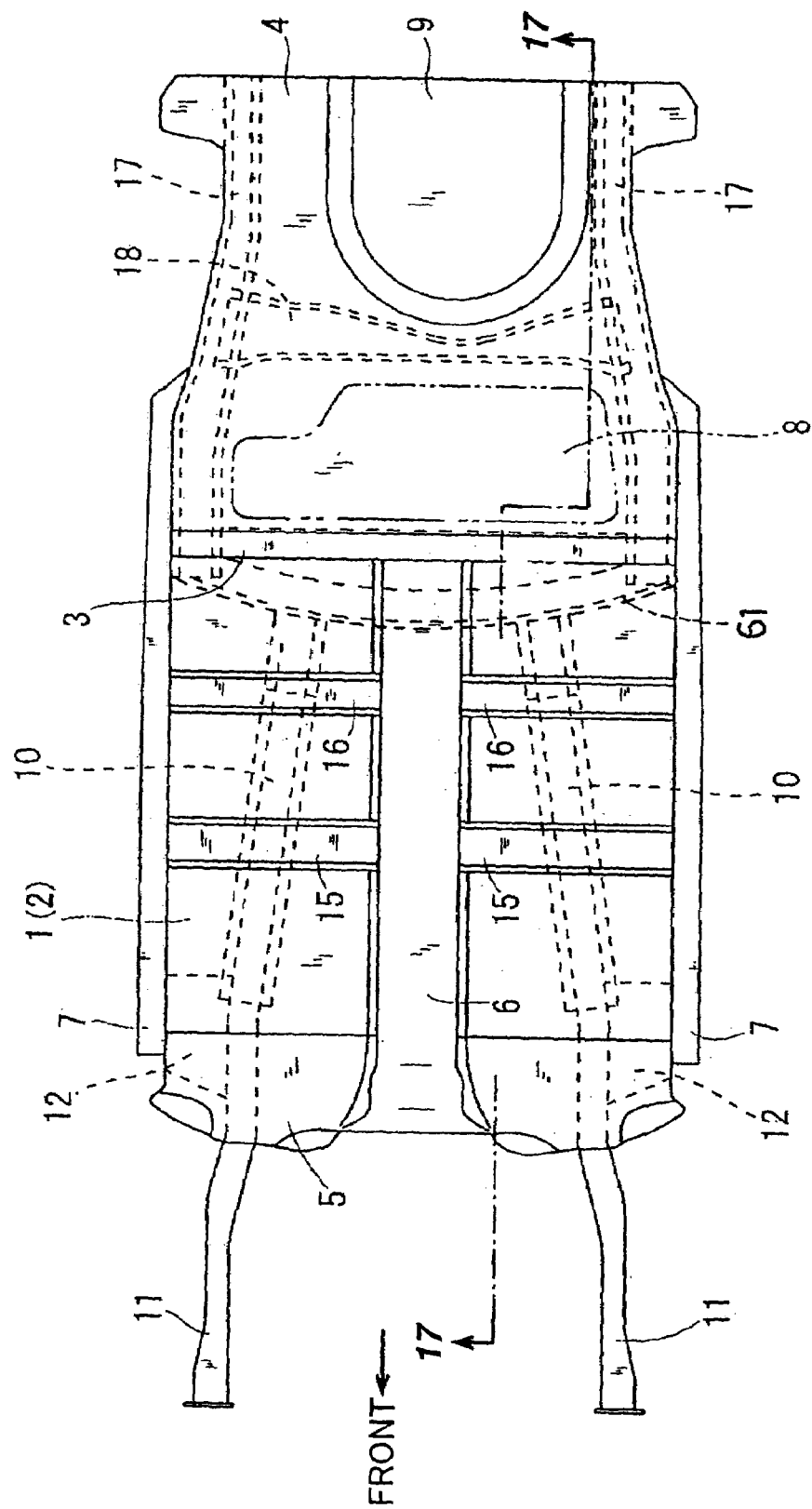
FIG. 16 is a top plan view corresponding to FIG. 1, which shows an automobile underbody structure according to still another embodiment of the present invention.
Figure 17:
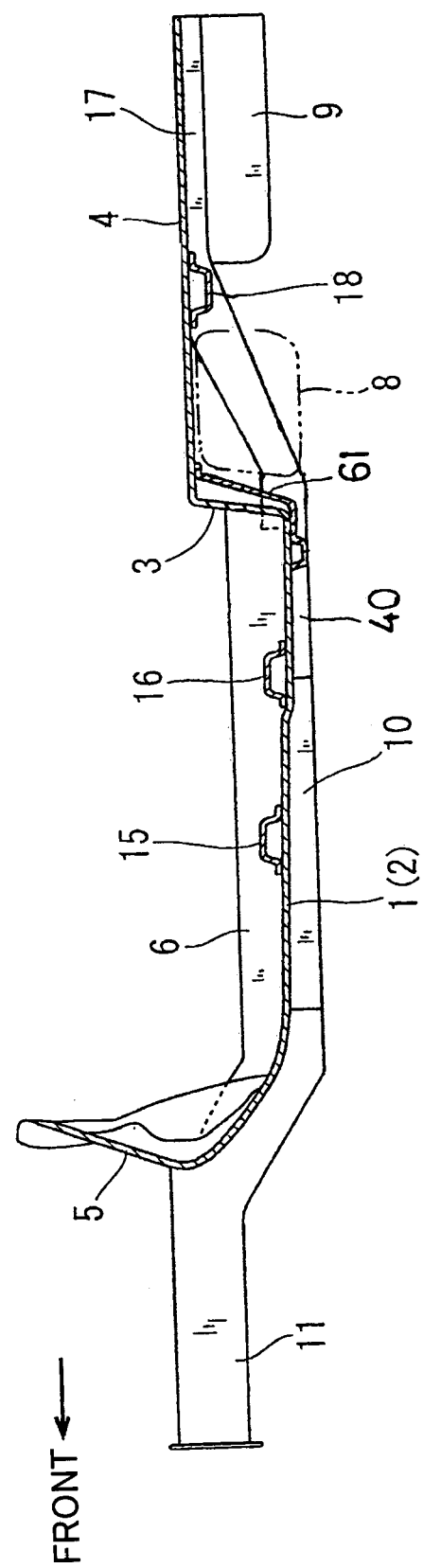
FIG. 17 is a sectional view taken along the line 17-17 in FIG. 16.
Figure 18:
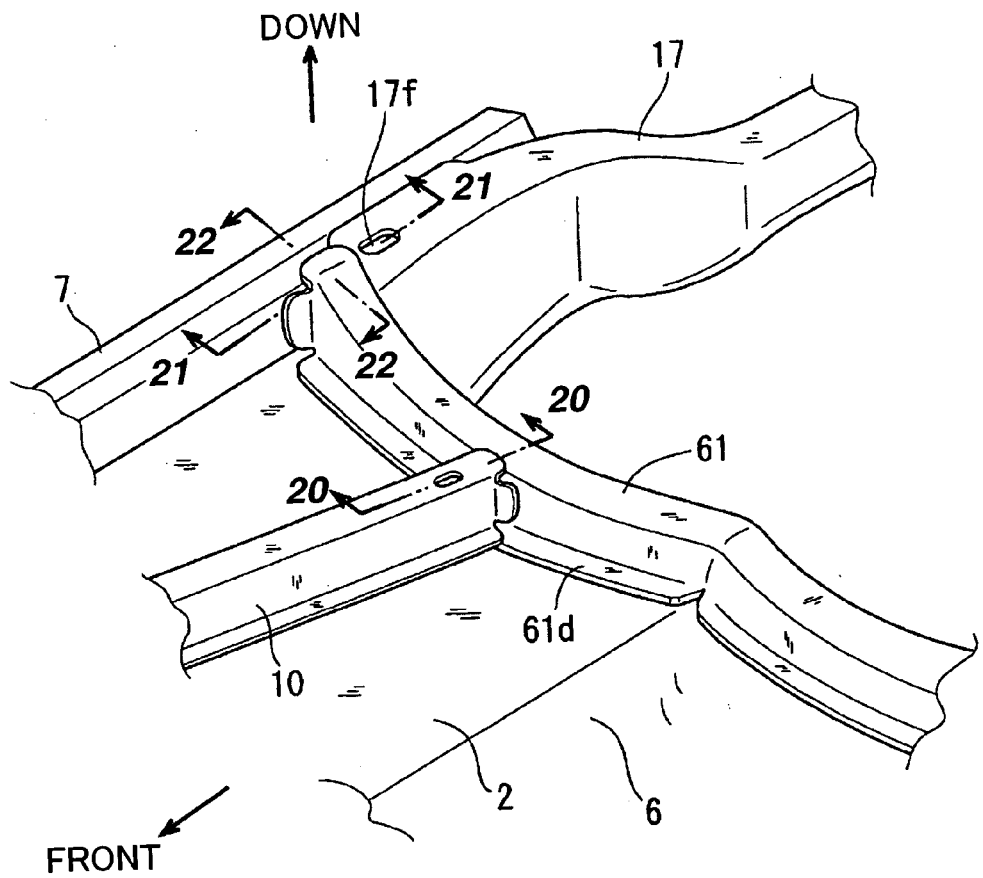
FIG. 18 is a perspective bottom view showing the detail of the vicinity of a rear end region of a floor frame.

FIGS. 16 and 17 show an automobile underbody structure having a load cross member 61, according to still another embodiment of the present invention. In these figures, the same component or element as that in the aforementioned embodiments is defined by the same reference numeral or mark, and its description will be omitted.

As shown in FIGS. 16 and 17, each rear end region of a pair of laterally-spaced floor frames 10 is joined to a fourth cross member 61 disposed in the vicinity of a rear kick-up portion 3 to serve as a load cross member. This fourth cross member 61 is disposed to extend laterally, and formed in an arch shape protruding frontward in top plan view.

Figure 19:
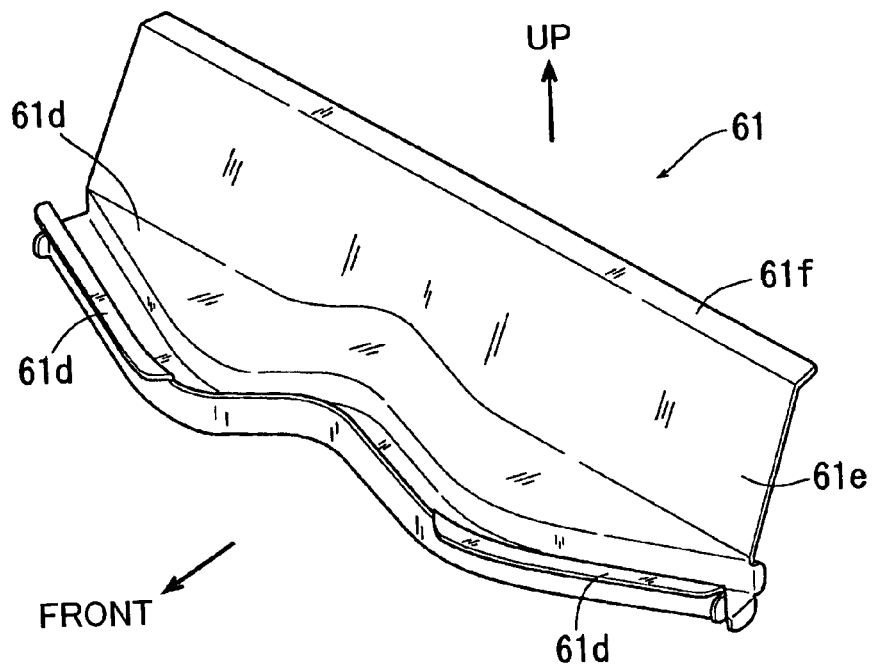
FIG. 19 is a perspective view showing one example of an arch-shaped cross member.

With reference to FIGS. 18 to 22, the detail of the fourth cross member 61 will be described below. The fourth cross member 61 generally has a shape as shown in FIG. 19, and includes a reverse-hat-shaped portion in section which is to be joined to a bottom surface of the front floor portion 2. The reference numeral 61d indicates a flange to be joined to the front floor portion 2. A rear region of the flange 61d is formed in an arch shape protruding frontward in top plan view to have a large area, and a rear wall 61e extends upward from a rear end of the rear flange region 61d. Further, a flange 61f is formed at an upper end of the rear wall 61e to serve as a junctional region to a bottom surface of a rear floor portion 4.

Figure 20:
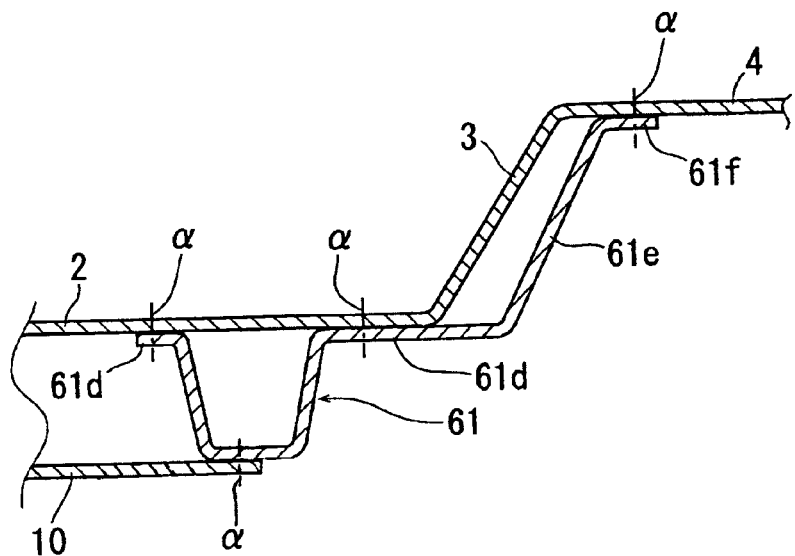
FIG. 20 is a sectional view taken along the line 20-20 in FIG. 18.
Figure 21:
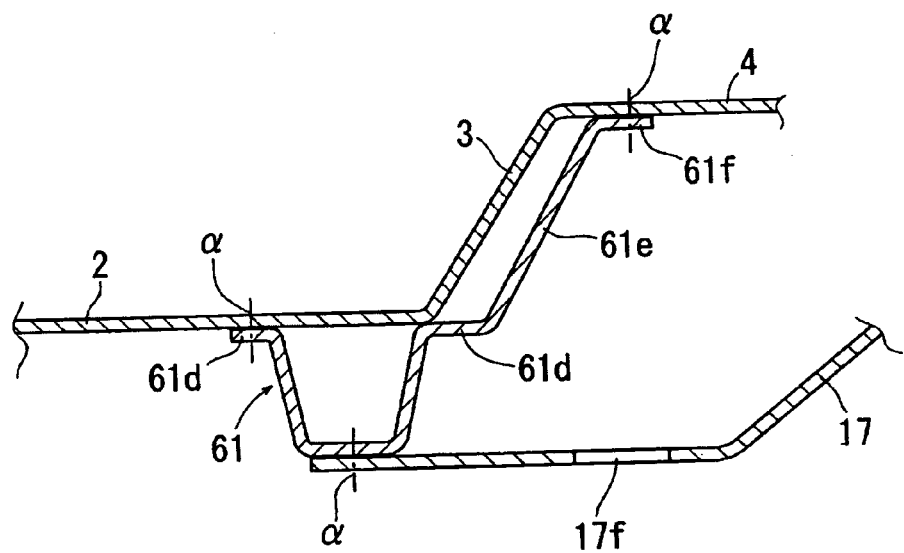
FIG. 21 is a sectional view taken along the line 21-21 in FIG. 18.
Figure 22:
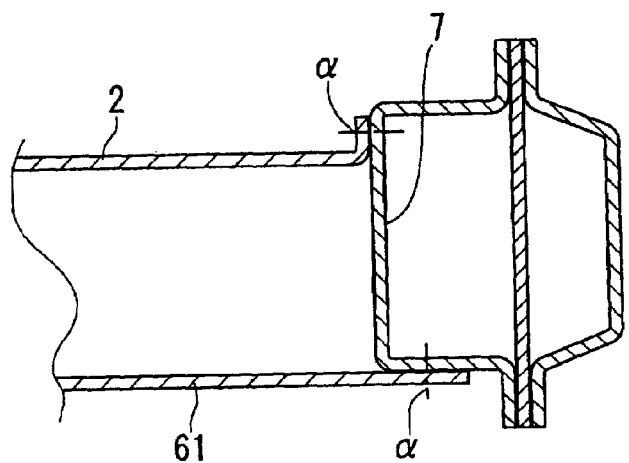
FIG. 22 is a sectional view taken along the line 22-22 in FIG. 18.

The fourth cross member 61 is joined to the bottom surface of the front floor portion 2 by the flange 61d thereof (see FIGS. 18, 20 and 21), and joined to the bottom surface of the rear floor portion 4 by the flange 61 thereof (see FIGS. 20 and 21). In this manner, the fourth cross member 61 defines a closed section in cooperation with the rear kick-up portion 3. The fourth cross member 61 also has opposite lateral ends jointed, respectively, to a pair of laterally-spaced side-sills 7 (see FIG. 22).

Figure 23:
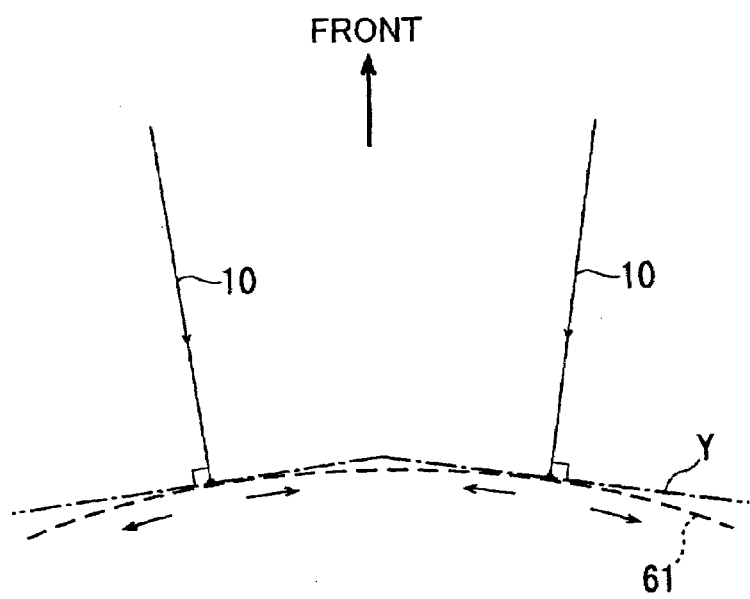
FIG. 23 is an explanatory diagram of a transmission mode of a rearward load to a fourth cross member.

The approximately reverse-hat-shaped portion of the fourth cross member 61 is formed to have a circular arc shape having a center point located, for example, at the rear of an automobile body. The center point may be set at an intersecting point between a longitudinal axis of the automobile body passing through the lateral center thereof and each rearward extension line of the floor frames 10. FIG. 23 shows a rearward load transmission at an intersecting area between each of the floor frames 10 and the fourth cross member 61 which is determined in the above manner. In FIG. 23, the floor frames 10 and the fourth cross member 61 are simplified, and only their axes are shown. As seen in FIG. 23, a rearward load from each of the floor frames 10 is dispersed laterally rearward at the intersecting area between the floor frame 10 and the fourth cross member 61, and the laterally-rearward-dispersed load is transmitted to the fourth cross member 61. This laterally-rearward-dispersed load acts on the fourth cross member 61 as a compressive force.

In FIG. 23, the one-dot chain line is a virtual line Y which passes through the intersecting area between each of the floor frames 10 and the fourth cross member 61, and intersects with the axis of the floor frame 10 at a right angle. The fourth cross member 61 is designed to be located rearward relative to this virtual line Y. In other words, the fourth cross member 61 is designed to be located rearward in the axial direction of each of the floor frames 10, as a distance from the axis of the floor frame 10 is increased.

When a rearward load from each of the floor frames 10 is entered into the fourth cross member 61, the fourth cross member 61 receives the rearward load in the form of compression against which it has a strong resistance in terms of material dynamics as described above, or securely receives the rearward load. In addition, the rearward load from each of the floor frames 10 is further transmitted to a pair of laterally-spaced rear frames 17 through the fourth cross member 61, and more securely received. The fourth cross member 61 can naturally increase the rigidity of the automobile body and receive a load during a side-impact collision. This is also desirable in view of measures against a side-impact collision. Further, the fourth cross member 61 can contribute to preventing or suppressing a rearward movement of the floor frames during a head-on collision. This is desirable in protecting a fuel tank 8 and others.

The fourth cross member 61 illustrated in FIGS. 18 to 22 may be designed to have only the approximately reverse-hat-shaped portion in section and define no closed section in cooperation with the rear kick-up portion 3 (define only a closed section in cooperation with the front floor portion 2). In this case, a usable space protruding frontward is formed under the front floor portion 2 and just behind the fourth cross member 61. Thus, the fuel tank 8 may extend up to the usable space to increase a capacity of the fuel tank 8.

FIGS. 24 to 30 show an automobile underbody structure having a connection frame 40, according to yet another embodiment of the present invention. In these figures, the same component or element as that in the aforementioned embodiments is defined by the same reference numeral or mark, and its description will be omitted.

Figure 24:
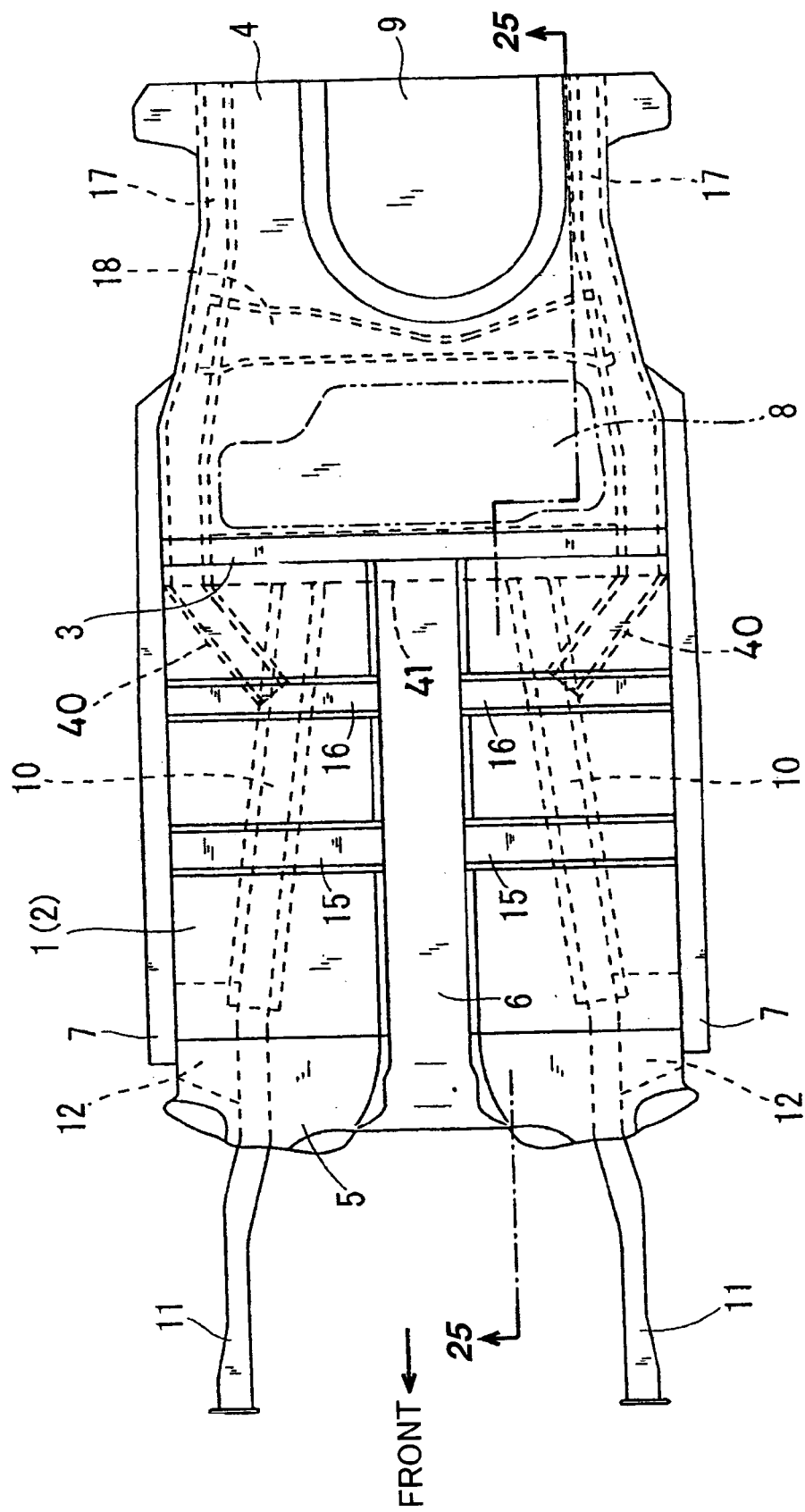
FIG. 24 is a top plan view corresponding to FIG. 1, which shows an automobile underbody structure according to another further embodiment of the present invention.
Figure 25:
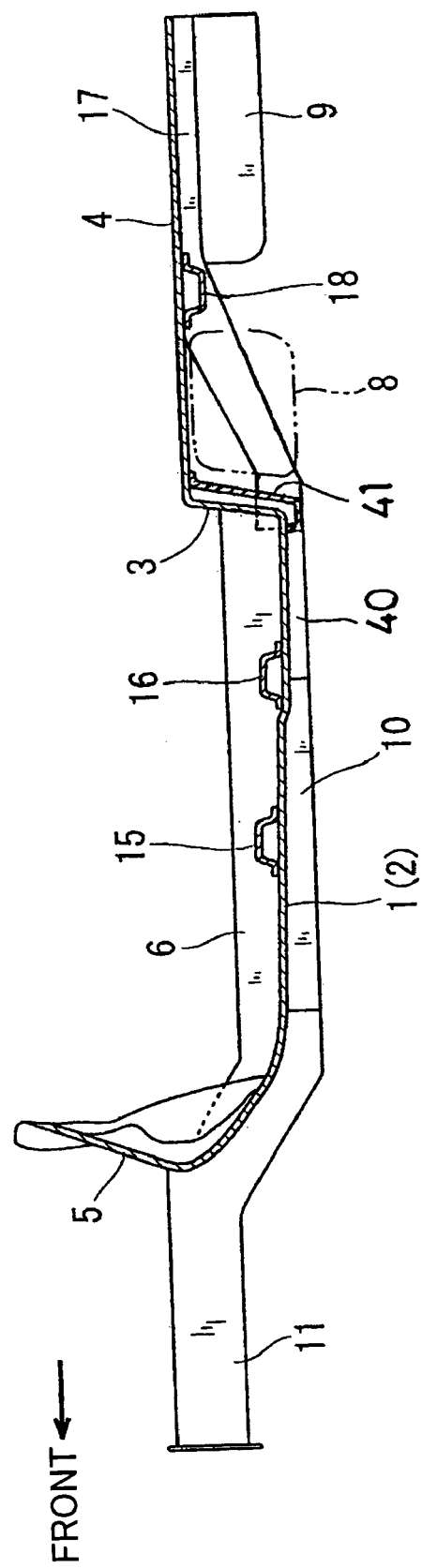
FIG. 25 is a sectional view taken along the line 25-25 in FIG. 24.
Figure 27:
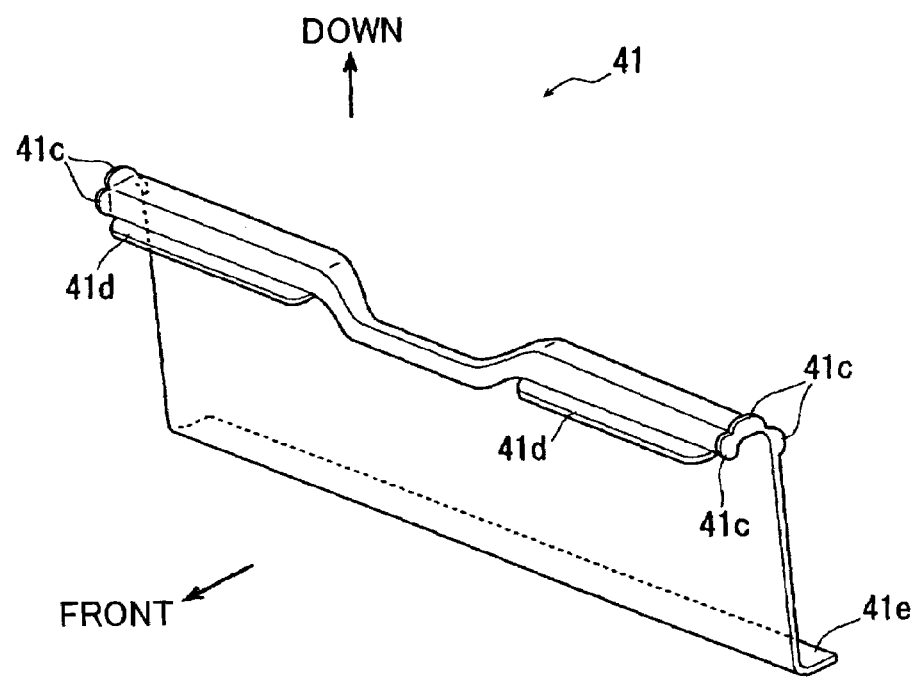
FIG. 27 is a perspective view showing one example of a fifth cross member.

As shown in FIGS. 24 and 25, respective front end regions of a pair of laterally-spaced rear frames 17 in this embodiment are connected to one another by a fifth cross member 41 extending laterally to serve as a rear cross member. Respective rear end regions of a pair of laterally-spaced floor frames 10 are connected to the fifth cross member. The fifth cross member 41 generally has a shape as shown in FIG. 27. Specifically, the fifth cross member 41 is joined to the rear frames 17 by use of a pair of flanges 41c formed, respectively, at opposite lateral ends thereof, and joined to a bottom surface of a rear end region of the front floor portion 2 by use of a flange 41d formed at a lower end thereof. Further, the fifth cross member 41 is joined to a bottom surface of a front end region of a rear floor portion 4 by use of a flange 41e formed at an upper end thereof. This fifth cross member 41 defines a closed section in cooperation with a the rear end region of the front floor portion 2, a rear kick-up portion 3 and the front end region of the rear floor portion 4.

Figure 26:
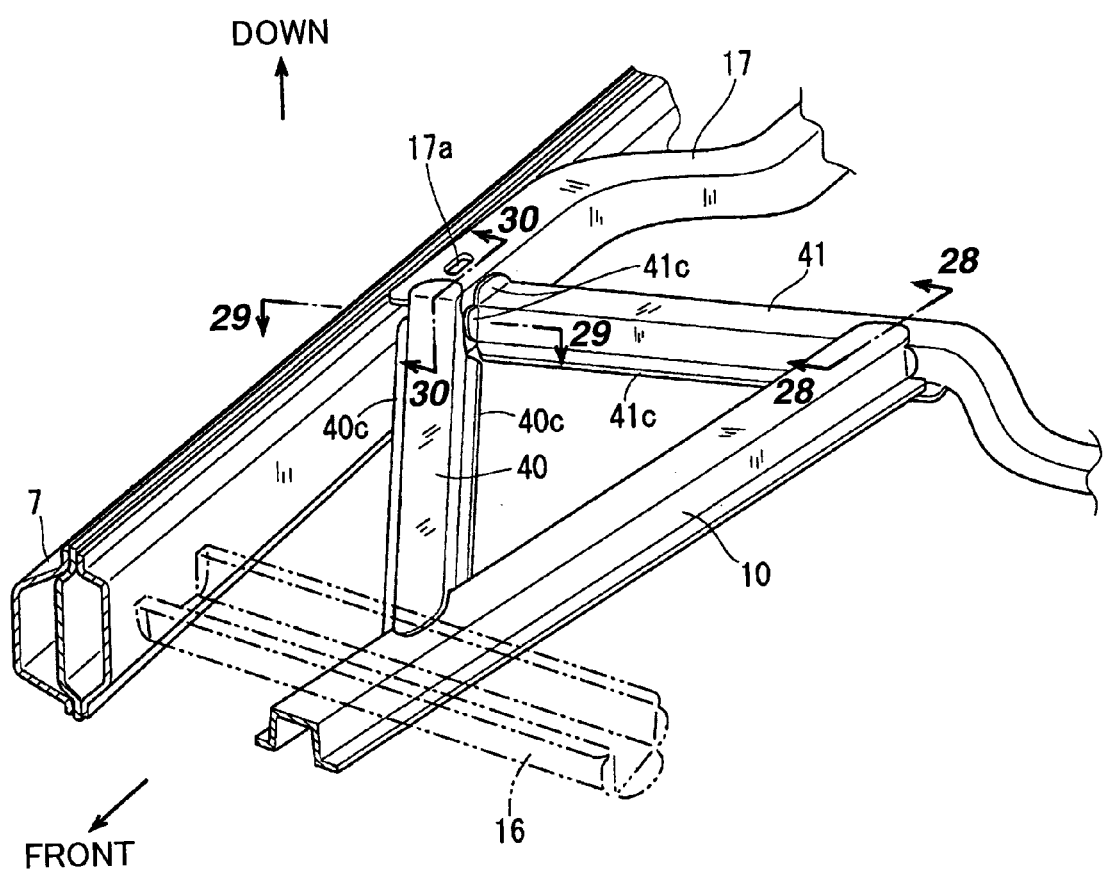
FIG. 26 is a detail view showing the vicinity of a connection frame, wherein a floor panel is omitted.

As shown in FIGS. 24 and 26, an intersecting area with a second cross member 16 in each rear end region of the floor frames 10 is connected to the front end region of the corresponding rear frame 17 through one of a pair of connection frames 40 (in this embodiment, each of the connection frames 40 is connected to a corresponding one of the rear frames 17 in such a manner that a rear end of the connection frame 40 obliquely comes into contact with a front end of the rear frame 17). More specifically, each of the connection frames 40 generally has a reverse-hat shape in section. Each of the connection frames 40 is joined to the bottom surface of the front floor portion 2 by use of a flange 40c thereof, and joined to an inward-facing surface of a corresponding one of a pair of laterally-spaced side-sills 7 by use of the flange 40c.

Figure 28:
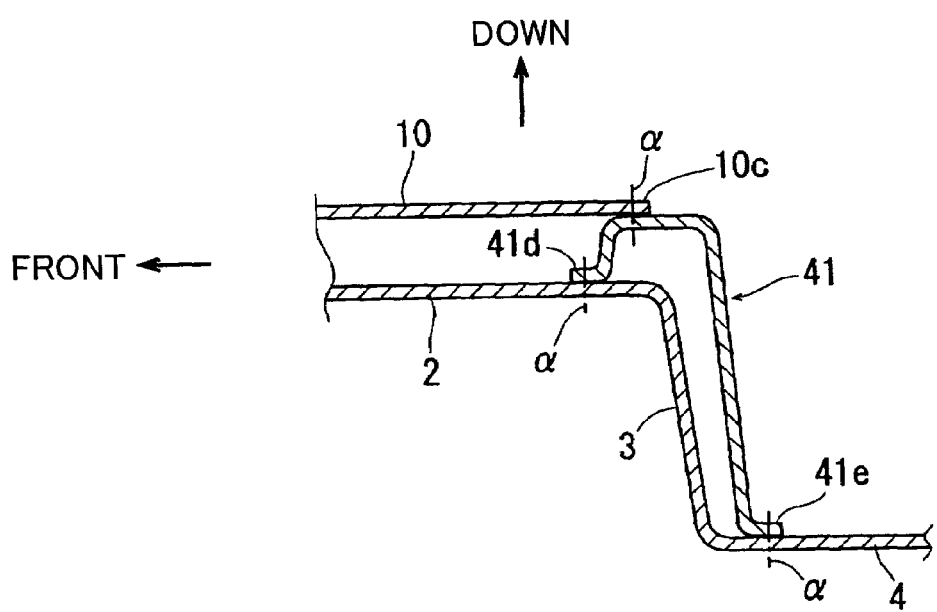
FIG. 28 is a sectional view taken along the line 28-28 in FIG. 26.

With reference to FIGS. 26 to 30, the connection frame 40 and the fifth cross member 41 will be described in detail. As shown in FIGS. 26 and 28, the fifth cross member 41 and one of the floor frames 10 are joined together in such a manner that the rear end of the floor frame 10 is in contact with a front surface of the lower end region of the fifth cross member 41 (the fifth cross member 41 has a sectional shape as shown in FIG. 28 over the entire length thereof). That is, this connection structure is designed to allow a rearward load during a head-on collision to be effectively entered from the floor frame 10 into the fifth cross member 41.

Figure 29:
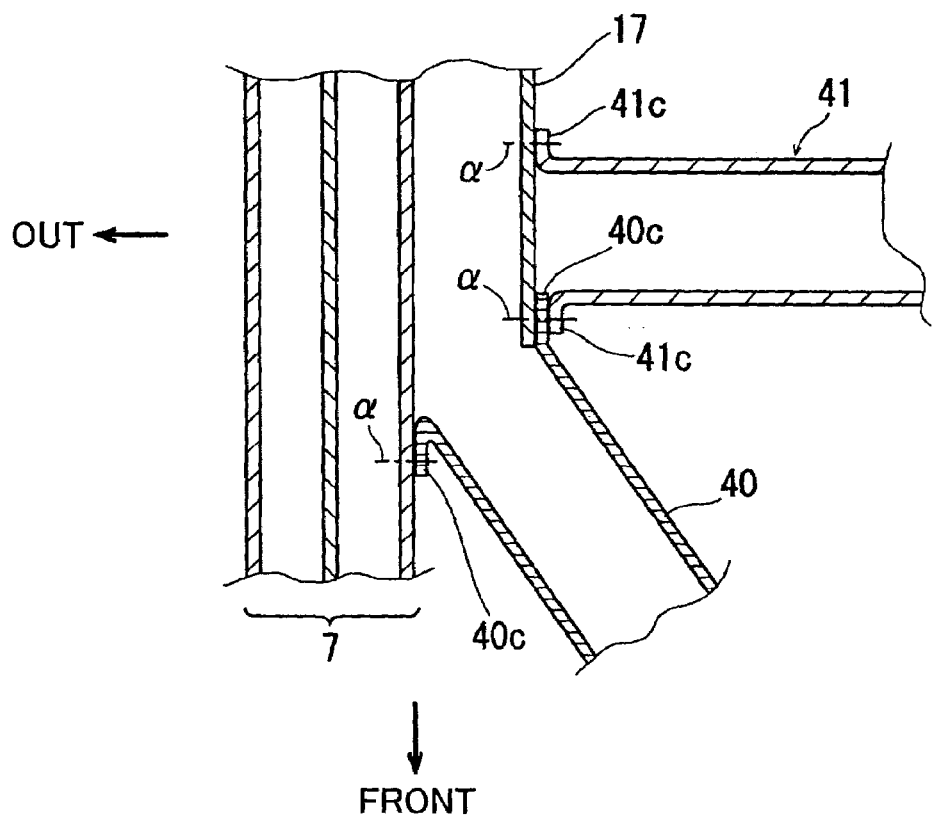
FIG. 29 is a sectional view taken along the line 29-29 in FIG. 26.
Figure 30:
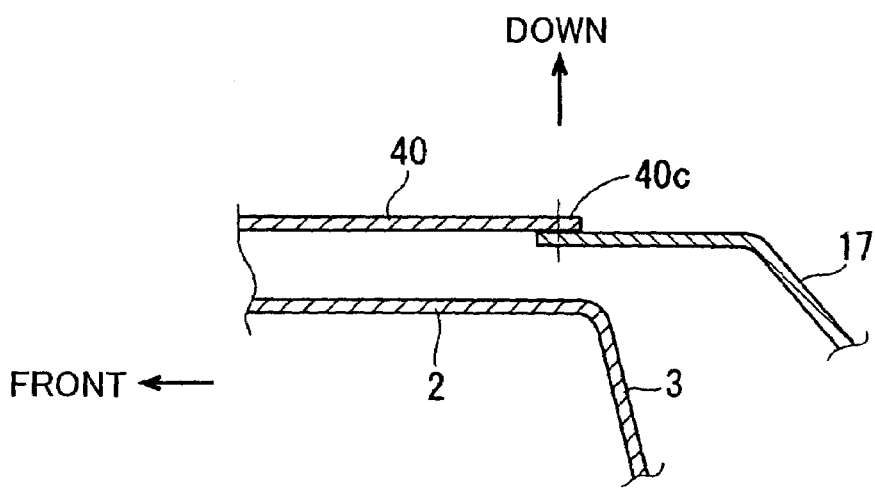
FIG. 30 is a sectional view taken along the line 30-30 in FIG. 26.

A connection structure of the connection frame 40 and the fifth cross member 41 to the corresponding rear frame 17 are shown in FIGS. 26, 29 and 30. Specifically, the front end region of the rear frame 17 is joined to the rear end region of the corresponding side-sill 7. The flange 40c of the connection frame 40 is joined to an inward-facing surface and a bottom surface of the rear frame 17, and to the inward-facing surface of the side-sill 7. In this manner, the above connection structure allows a rearward impact load entered into the connection frame 40 to be transmitted directly to not only the rear frame 17 but also the side-sill 7. In particular, the connection frame 40 is connected to the rear frame 17 in such a manner that rear end of the connection frame 40 comes in contact with the front end of the rear frame 17, though obliquely. This makes it possible to quite effectively transmit the rearward impact load from the connection frame 40 to the rear frame 17.

The fifth cross member 41 is joined to the inward-facing surface of the rear frame 17 by the flange 41c thereof. Further, a part of the flange 41c of the fifth cross member 41 is joined to the rear frame 17 through a part of the flange 40c of the connection frame 40 in a three-layer structure. Furthermore, in order to facilitate a joining operation, the bottom surface of the front end region of the rear frame 17 is formed with a operation hole 17a for welding, as shown in FIG. 26.

The connection frame 40 makes it possible to sufficiently reinforce a specific area of the front floor portion 2 on the frontward side of the rear kick-up portion 3 (fifth cross member 41), on the rearward side of the second cross member 16, on the inward side of the side-sill 7 and on the outward side of the tunnel region 6, in top plan view. That is, in the specific area, a first triangular region surrounded by the floor frame 10, the fifth cross member 41 and the connection frame 40, and a second triangular region surrounded by the connection frame 40, the side-sill 7 and the second cross member 16 are defined. This allows the specific area to have extremely high strength (rigidity) in its entirety. Then, the position of the second cross member 16 in the longitudinal direction of the automobile body is arranged at a position where a lower end region of a B pillar (not shown) is connected to the underbody structure. The two triangular regions correspond to a region to which the B pillar is connected, or a region serving as a base of the B pillar. The triangular regions have a significantly high strength suited for such a roll.

In two sets of longitudinally-spaced cross members 15, 16, a large rearward impact load is transmitted from the floor frames 10 to a first cross member 15 located on the front side as compared with the second cross member 16 located on the rear side. In other words, the rearward impact load to be transmitted to the second cross member 16 located on the rear side is reduced to a relatively small value so as to prevent or suppress an excessive rearward displacement of each rear end of the floor frames 10. Further, the fifth cross member 41 makes it possible to more reliably prevent or suppress the rearward displacement of each rear end of the floor frames 10.

In addition to the above advantages, the rearward impact load entered into the floor frames 10 can be effectively received by the side-sills 7 and the rear frames 17 through the connection frames 40, and further effectively received by the fifth cross member 41. Further, a lateral load during a side-impact collision can also be effectively received by the connection frames 40 and the fifth cross member 41, and further effectively received by the floor frames 10 through the connection frames 40. Thus, this underbody structure can effectively serve as measures against both a head-on collision and a side-impact collision.

While the present invention has been described with reference to the above specific embodiments, it is not intended to be limited to the invention in these embodiments. It is obvious to those skilled in the art that various changes and modifications may be made therein without departing from the spirit and scope thereof as set forth in appended claims. For example, it is intended that the following modifications may be encompassed within the scope of the present invention. The floor flame 10 may be made of the same material over the entire length thereof (e.g. made of high-tensile steel over the entire length). The number of cross members intersecting with the floor frames 10 in top plan view is not limited to two sets, but may be one set or three sets or more. The cross member 15, 16 may be joined to the bottom surface of the front floor portion 2. The fourth cross member 61 or 71 may be joined to the top surface of the front floor portion 2. The fourth cross member 61 may be designed to be reduced in vertical length so as to prevent the upper end thereof from reaching the rear floor portion 4, and a closed section may be defined only between the rear end region of the front floor portion 2 and the lower end region of the rear kick-up portion 3. Alternatively, the underbody structure may be designed without the fourth cross member 61. It is to be understood that the object of the present invention is not limited to one explicitly described herein, but it is intended that any objectives substantially expressed as preferred or advantageous aspects are implicitly included therein.

In summary, the present invention provides an automobile underbody structure comprising: a floor panel which includes a front floor portion connecting a pair of laterally-spaced side-sills to one another and having a tunnel region extending longitudinally along the lateral center thereof, a rear kick-up portion extending upward from a rear end of the front floor portion, and a rear floor portion extending from an upper end of the rear kick-up portion rearward and approximately linearly; a pair of laterally-spaced floor frames disposed to extend longitudinally in such a manner as to interpose the tunnel region therebetween, and joined to a bottom surface of the front floor portion; a cross member disposed to extend laterally so as to connect each of the side-sills and the tunnel region, and joined to the front floor portion; and a pair of laterally-spaced front frames each having a rear end joined to a front end of a corresponding one of the floor frames. Each of the floor frames has a rear end extending up to the vicinity of the rear kick-up portion, and each of the floor frames is inclined laterally inward toward the rear end thereof so as to be obliquely disposed relative to the cross member in top plan view.

According to the above solution, due to occurrence of a head-on collision, when the floor frames receiving a rearward load from the front frames is just about being displaced rearward, the floor frames will exert a compressive force on a region of the cross member located on the laterally outward side relative to each of the floor frames, and a tensile force on a region of the cross member located on the laterally inward side relative to each of the floor frames. Thus, the cross member can receive the load during the head-on collision in the form of compression and tension against which the cross member has a strong resistance in terms of material dynamics, so that the load during the head-on collision can be effectively received or absorbed by the cross member. As compared with a pair of floor frames each disposed to extend straight and parallel to the longitudinal axis of an automobile body, the inclined floor frames make it possible to reliably increase the entire length thereof. This is also desirable in enhancing a shock-absorbing function of the floor frames themselves.

Preferred embodiments based on the above solution are as described in claims 2 to 10 of the appended claims.

Specifically, each of the floor frames may have a front portion made of high-tensile steel, and a rear portion made of ordinary steel, and the front portion may extend rearward up to a position where the front portion intersects with the cross member in top plan view (corresponding to claim 2). In this case, each front portion of the front frames requiring a high strength against plastic deformation is made of high-tensile steel. Thus, when each of the floor frames receiving a rearward load during a head-on collision disperses the load while being moved rearward, it can effectively transmit the load to the cross member in conjunction with the rearward movement without occurrence of buckling therein. In addition, each rear portion of the floor frames having a smaller rearward movement is made of common or ordinary steel. This is desirable in facilitating reduction in cost.

The automobile underbody structure may further include a connection member disposed to extend laterally in the vicinity of the rear kick-up portion so as to connect respective rear end regions of the floor frames to one another (corresponding to claim 3). In this case, the connection member can prevent or suppress an excessive rearward displacement of each rear end of the floor frames. This is desirable in protecting a fuel tank disposed at the rear of the floor frames. In addition, the connection between the rear end regions of the floor frames through the connection member is desirable in increasing the rigidity of the automobile body in its entirety. Furthermore, a distance between the rear ends of the floor frames is set to be less than a distance between the front ends of the floor frames. This allows the connection member to have a relatively short lateral length.

The above connection member may be joined to the front floor portion in the vicinity of the tunnel region and at respective lateral positions interposing the tunnel region therebetween (corresponding to claim 4). In this case, the connection member can be effectively used for preventing the tunnel region from being laterally expanded. This is desirable in sufficiently ensuring the rigidity of the automobile body.

Each of the floor frames may be composed of two mutually connected members serving as the front and rear portions thereof, and generally formed in an approximately reverse-hat shape in section, which has a pair of laterally-spaced sidewalls, a bottom wall connecting respective lower ends of the sidewalls to one another, and a pair of laterally-spaced flanges each extending from a corresponding one of upper ends of the sidewalls. Further, each rear portion of the floor frames may have a front end region formed as an enlarged region enlarged downward and laterally, and each front portion of the floor frames may have a rear end region which is fitted into the enlarged region of the corresponding rear portion. The front and rear portions are joined together in the fitted state (corresponding to claim 5). In this case, the front and rear portions of the floor frame can be firmly connected together, while allowing each of floor frames to be formed in a commonly-used reverse-hat shape in section.

The cross member may include a first cross member disposed at a longitudinally approximately intermediate position of the front floor portion, and a second cross member disposed between the first cross member and the rear kick-up portion. Further, each of the floor frames may be obliquely disposed relative to the first and second cross members in top plan view (corresponding to claim 6). In this case, a load during a head-on collision can be effectively received by the two sets of longitudinally-spaced cross members.

Each of the above first and second cross members may have a pair of longitudinally-spaced flanges joined to a top surface of the front floor portion, and each of the floor frames may have a pair of laterally-spaced flanges joined to a bottom surface of the front floor portion. Further, the longitudinally-spaced flanges of each of the cross members and the laterally-spaced flanges of each of the floor frames may be joined to each other together with the front floor portion in a three-layer structure, at respective positions where the longitudinally-spaced and laterally-spaced flanges intersect with each other in top plan view (corresponding to claim 7). In this case, a load from the floor members can be effectively transmitted to the cross members through the joined regions having the three-layer structure, while allowing each of the cross members and the floor frames to be joined to the front floor portion by means of a commonly-used flange.

The front frames may extend longitudinally and parallel to one another, and a distance between the respective front ends of the floor frames may be set to be approximately equal to a distance between the respective rear ends of the front frames (corresponding to claim 8). In this case, a load during a head-on collision can be effectively transmitted from the front frames to the corresponding floor frames, while using a commonly-used parallel arrangement of the front frames themselves to allow an engine and other component to be mounted between the front frames in a conventional manner.

The automobile underbody structure may further include a load cross member joined to the front floor portion and disposed to extend laterally so as to intersect with each of the floor frame, and a pair of laterally-spaced rear frames disposed under the rear floor portion to extend longitudinally. Further, the load cross member may connect each rear end region of the floor frames and a front end region of the rear frame to one another, and the load cross member may be formed in an approximately arch shape protruding frontward in top plan view. Furthermore, each of the rear frames may have a front end region connected to a rear end region of a corresponding one of the side-sills (corresponding to claim 9). In this case, during a head-on collision, a rearward load transmitted to the front frames is also transmitted to the load cross member, and the load cross member will receive the load during the head-on collision in the form of compression against which the load cross member has a strong resistance in terms of material dynamics, so that the load during the head-on collision can be effectively received or absorbed by the load cross member. More specifically, when the load cross member is just about being deformed in response to the rearward load entered therein, in such a manner that the arch shape is changed to a laterally linear shape, the load cross member can bring out a large resistance force against such a deformation. This is desirable in reliably receiving the rearward load by a cross member. In addition, the above structure is designed to connect the load cross member to the rear frame. This allows the rearward load from the front frames to be additionally received by the rear frame which conventionally has no function of receiving the rearward load.

The automobile underbody structure may further include a pair of laterally-spaced rear frames disposed under the rear floor portion to extend longitudinally, and a connection frame joined to the bottom surface of the front floor portion. Further, each of the rear frames may have a front end region connected to a rear end region of a corresponding one of the side-sills, and the connection frame may have a rear end region connected to each front end region of the rear frames, and a front end region disposed at a position of the bottom surface of the front floor portion corresponding to an intersecting area between each of the floor frames and the cross member (corresponding to claim 10). In the aforementioned structure, due to the inclined arrangement of the floor frames, each rear end of the floor frames is located fairly far from each of the side-sills. This is likely to cause a problem about NVH (Noise, Vibration, Harshness) in a specific area located between each of the side-sill and the floor frame adjacent thereto and in the range of the rear kick-up portion to the cross member in front of the rear kick-up portion. In contrast, according to this structure, the specific area is reinforced by the connection frame. This is desirable in reducing NVH. Further, a rearward load entered into the front frames due to a head-on collision will be additionally received by the rear frames through the connection frame. This is desirable in increasing the rigidity of the automobile body. In addition, the connection frame can receive a load entered into the side-sill during a side-impact collision, and transmit the side-impact load to the floor frames. This is desirable in terms of measures against a side-impact collision.

As above, according to the present invention, a load during a head-on collision can be effectively received by the cross member. In addition, the length of each of the floor frames can be maximized to obtain enhanced shock-absorbing function.

This application is based on Japanese Patent Application Ser. Nos. 2004-274515, 2004-274516, and 2004-284893, filed on Japan Patent Office on Sep. 22, 2004, Sep. 22, 2004, and Sep. 29, 2004, respectively, the contents of which are hereby incorporated by reference.

What is claimed is:

1. An automobile underbody structure comprising:
   a floor panel which includes a front floor portion connecting a pair of laterally-spaced side-sills to one another and having a tunnel region extending longitudinally along the lateral center thereof, a rear kick-up portion extending upward from a rear end of said front floor portion, and a rear floor portion extending from an upper end of said rear kick-up portion rearward and approximately linearly;
   a pair of laterally-spaced floor frames disposed to extend longitudinally in such a manner as to interpose said tunnel region therebetween, and joined to a bottom surface of said front floor portion;
   a cross member disposed to extend laterally so as to connect each of said side-sills and said tunnel region, and joined to said front floor portion; and
   a pair of laterally-spaced front frames each having a rear end joined to a front end of a corresponding one of said floor frames,
   wherein each of said floor frames has a rear end extending up to the vicinity of said rear kick-up portion, each of said floor frames being inclined laterally inward toward the rear end thereof so as to be obliquely disposed relative to said cross member in top plan view and each of said floor frames is being connected to the cross member at a position where they intersect with each other in the top plan view via said front floor portion.

2. The automobile underbody structure as defined in claim 1, wherein each of said floor frames has a front portion made of high-tensile steel, and a rear portion made of ordinary steel, said front portion extending rearward up to a position where said front portion intersects with said cross member in top plan view.

3. The automobile underbody structure as defined in claim 2, which further includes a connection member disposed to extend laterally in the vicinity of said rear kick-up portion so as to connect respective rear end regions of said floor frames to one another.

4. The automobile underbody structure as defined in claim 3, wherein said connection member is joined to said front floor portion in the vicinity of said tunnel region and at respective lateral positions interposing said tunnel region therebetween.

5. The automobile underbody structure as defined in claim 2, wherein each of said floor frames is composed of two mutually connected members serving as said front and rear portions thereof, and generally formed in an approximately reverse-hat shape in section, which has a pair of laterally-spaced sidewalls, a bottom wall connecting respective lower ends of said sidewalls to one another, and a pair of laterally-spaced flanges each extending from a corresponding one of upper ends of said sidewall; wherein:
   each rear portion of said floor frames has a front end region formed as an enlarged region enlarged downward and laterally, and
   each front portion of said floor frames has a rear end region which is fitted into said enlarged region of said corresponding rear portion,
   wherein said front and rear portions are joined together in said fitted state.

6. The automobile underbody structure as defined in claim 1, wherein said cross member includes a first cross member disposed at a longitudinally approximately intermediate position of said front floor portion, and a second cross member disposed between said first cross member and said rear kick-up portion, wherein each of said floor frames is obliquely disposed relative to said first and second cross members in top plan view.

7. The automobile underbody structure as defined in claim 6, wherein:
   each of said first and second cross members has a pair of longitudinally-spaced flanges joined to a top surface of said front floor portion; and
   each of said floor frames has a pair of laterally-spaced flanges joined to a bottom surface of said front floor portion,
   wherein said longitudinally-spaced flanges of each of said cross members and said laterally-spaced flanges of each of said floor frames are joined to each other together with said front floor portion in a three-layer structure, at respective positions where said longitudinally-spaced and laterally-spaced flanges intersect with each other in top plan view.

8. The automobile underbody structure as defined in claim 1, wherein said front frames extend longitudinally and parallel to one another, and a distance between the respective front ends of said floor frames is set to be approximately equal to a distance between the respective rear ends of said front frames.

9. The automobile underbody structure as defined in claim 1, which further includes:
   a load cross member joined to said front floor portion and disposed to extend laterally so as to intersect with each of said floor frame; and
   a pair of laterally-spaced rear frames disposed under said rear floor portion to extend longitudinally,
   wherein:
   said load cross member connects each rear end region of said floor frames and a front end region of said rear frame to one another, said load cross member being formed in an approximately arch shape protruding frontward in top plan view; and
   each of said rear frames has a front end region connected to a rear end region of a corresponding one of said side-sills.

10. The automobile underbody structure as defined in claim 1, which further includes:
    a pair of laterally-spaced rear frames disposed under said rear floor portion to extend longitudinally, and a connection frame joined to the bottom surface of said front floor portion, wherein:

each of said rear frames has a front end region connected to a rear end region of a corresponding one of said side-sills; and said connection frame has a rear end region connected to each front end region of said rear frames, and a front end region disposed at a position of the bottom surface of said front floor portion corresponding to an intersecting area between each of said floor frames and said cross member.

11. An automobile underbody structure comprising:

a floor panel which includes a front floor portion connecting a pair of laterally-spaced side-sills to one another and having a tunnel region extending longitudinally along the lateral center thereof, a rear kick-up portion extending upward from a rear end of said front floor portion, and a rear floor portion extending from an upper end of said rear kick-up portion rearward and approximately linearly;

a pair of laterally-spaced floor frames disposed to extend longitudinally in such a manna as to interpose said tunnel region therebetween, and joined to a bottom surface of said front floor portion;

a cross member disposed to extend laterally so as to connect each of said side-sills and said tunnel region, and joined to said front floor portion; and a pair of laterally-spaced front frames each having a rear end joined to a front end of a corresponding one of said floor frames, wherein each of said floor frames has a rear end extending up to the vicinity of said rear kick-up portion, each of said floor frames being inclined laterally inward toward the rear end thereof so as to be obliquely disposed relative to said cross member in top plan view, and each of said floor frames being connected to the cross member at a position where they intersect with each other in the top plan view via said front floor portion where said front frames extend longitudinally and parallel to one another, and a distance between the respective front ends of said floor frames is set to be approximately equal to a distance between the respective rear ends of said front frames.

12. The automobile underbody structure as defined in claim 11, further comprising a torque box, wherein the rear end of each of the front frames is designated to be located rearward relative to each front end of the side sills and where the rear end region of the front frame, the front end region of the corresponding side sill and the front end region of the corresponding floor frame are connected each other by said torque box which serves as a strength member.

* * * * *